United States Patent
Lewis et al.

(10) Patent No.: US 10,606,223 B2
(45) Date of Patent: Mar. 31, 2020

(54) MOBILE-BASED ENVIRONMENTAL CONTROL

(71) Applicant: AT&T Intellectual Property I, L.P., Atlanta, GA (US)

(72) Inventors: David George Lewis, Howell, NJ (US); Ellen B. Feinberg, Morganville, NJ (US); Isabella G. Szutkowski, Metuchen, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 456 days.

(21) Appl. No.: 14/957,783

(22) Filed: Dec. 3, 2015

(65) Prior Publication Data
US 2017/0159956 A1    Jun. 8, 2017

(51) Int. Cl.
| | | |
|---|---|---|
| *G05B 15/02* | (2006.01) | |
| *G06F 16/9537* | (2019.01) | |
| *F24F 11/30* | (2018.01) | |
| *F24F 110/20* | (2018.01) | |
| *F24F 11/58* | (2018.01) | |
| *F24F 110/10* | (2018.01) | |
| *F24F 11/56* | (2018.01) | |
| *F24F 11/65* | (2018.01) | |

(52) U.S. Cl.
CPC .............. *G05B 15/02* (2013.01); *F24F 11/30* (2018.01); *G06F 16/9537* (2019.01); *F24F 11/56* (2018.01); *F24F 11/58* (2018.01); *F24F 11/65* (2018.01); *F24F 2110/10* (2018.01); *F24F 2110/20* (2018.01); *G05B 2219/2642* (2013.01)

(58) Field of Classification Search
None
See application file for complete search history.

(56) References Cited

U.S. PATENT DOCUMENTS

| | | |
|---|---|---|
| 6,663,010 B2 | 12/2003 | Chene et al. |
| 6,754,504 B1 | 6/2004 | Reed |
| 8,085,145 B2 | 12/2011 | Fu et al. |
| 8,315,839 B2 | 11/2012 | Rosca et al. |
| 8,350,697 B2 | 1/2013 | Trundle et al. |
| 8,571,518 B2 | 10/2013 | Imes et al. |
| 8,635,154 B2 | 1/2014 | Chen et al. |
| 8,674,816 B2 | 3/2014 | Trundle et al. |
| 8,840,033 B2 | 9/2014 | Steinberg |
| 9,103,558 B2 | 8/2015 | Pine et al. |

(Continued)

OTHER PUBLICATIONS

Yun, Jaeseok, and Kwang-Ho Won. "Building Environment Analysis Based on Temperature and Humidity for Smart Energy Systems." *Sensors (Basel, Switzerland)* 12.10 (2012): 13458-13470. PMC. Web. Sep. 29, 2015.

*Primary Examiner* — Mohammad Ali
*Assistant Examiner* — Saad M Kabir
(74) *Attorney, Agent, or Firm* — Scott P. Zimmerman, PLLC

(57) ABSTRACT

Locational environmental control provides quicker and more efficient comfort. A location associated with a mobile device determines a ceiling fan and/or an air terminal that best serves the location. The ceiling fan may be activated to provide inexpensive climate control to the location associated with the mobile device. Conditioned air (heated or cooled) may be output from the air terminal to provide additional relief.

18 Claims, 30 Drawing Sheets

(56) References Cited

U.S. PATENT DOCUMENTS

| | | |
|---|---|---|
| 2003/0225542 A1* | 12/2003 | Liu ....................... F04D 27/004 |
| | | 702/132 |
| 2008/0277486 A1 | 11/2008 | Seem et al. |
| 2009/0065596 A1 | 3/2009 | Seem et al. |
| 2012/0031984 A1 | 2/2012 | Feldmeier et al. |
| 2013/0060387 A1* | 3/2013 | Imes ....................... H04L 67/42 |
| | | 700/278 |
| 2013/0245837 A1 | 9/2013 | Grohman |
| 2014/0031989 A1 | 1/2014 | Bergman et al. |
| 2014/0358291 A1 | 12/2014 | Wells |
| 2014/0365017 A1 | 12/2014 | Hanna et al. |
| 2015/0195099 A1 | 7/2015 | Imes et al. |
| 2015/0223705 A1 | 8/2015 | Sadhu |

* cited by examiner

MOBILE-BASED ENVIRONMENTAL CONTROL

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

HVAC systems are common in homes and businesses. These conventional climate control systems (commonly called heating, ventilating, and air conditioning or "HVAC" systems) establish comfortable ambient conditions for occupants. These conventional climate control systems, though, are unsuited to today's mobile communications environment.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
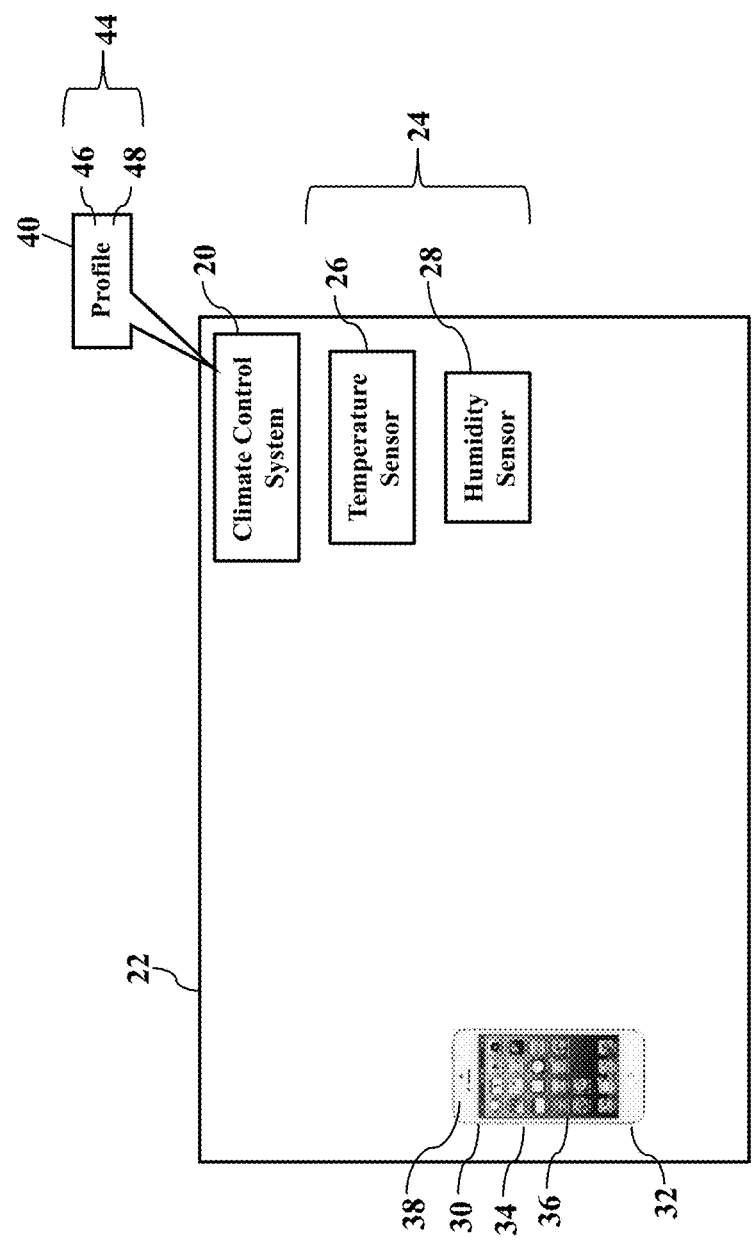
FIGS. 1-9 are simplified illustrations of an environment in which exemplary embodiments may be implemented.

FIGS. 1-9 are simplified illustrations of an environment in which exemplary embodiments may be implemented. FIG. 1 illustrates a climate control system 20 monitoring an environment, such as a room 22 in a home or business. The climate control system 20 heats or cools the room 22, which some readers may know as a heating, ventilating, and air conditioning ("HVAC") system. As the reader likely understands, the climate control system 20 interfaces with sensors 24 to heat or cool the room 22. FIG. 1, for example, illustrates a temperature sensor 26 and a humidity sensor 28. The sensors 24 generate output signals that are used to activate the climate control system 20 to heat or cool the room 22.

Here, though, exemplary embodiments are adapted to the mobile environment. That is, the climate control system 20 may track mobile devices 30 when heating or cooling. FIG. 1, for example, illustrates a mobile smartphone 32, which many people carry. The climate control system 20, though, may monitor or track any mobile device, as later paragraphs will explain. The climate control system 20 determines a location 34 of the smartphone 32 and heats or cools, based on the location 34. The climate control system 20 identifies the smartphone 32 (using a unique identifier 36, such as a cellular telephone number 38), retrieves a profile 40 associated with the smartphone 32, and heats or cools to preferred settings 44 defined by the profile 40. Suppose a user of the smartphone 32 stores her preferred temperature value 46 and/or humidity value 48 in the profile 40. When the location 34 associated with the smartphone 32 approximately matches the location associated with the room 22, the climate control system 20 may heat or cool to the user's preferred temperature value 46 and humidity value 48.

Figure 2:
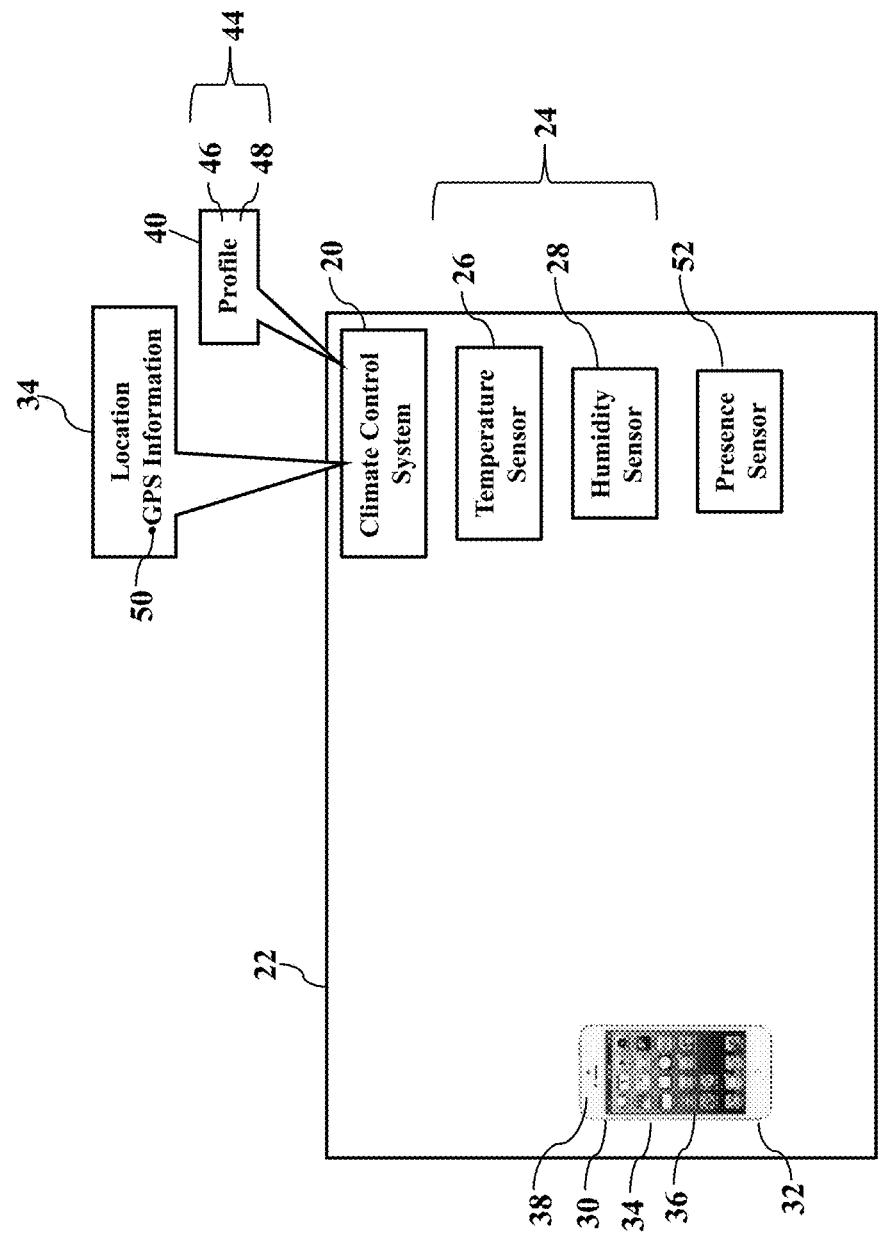

As FIG. 2 illustrates, any locational scheme may be used. The reader is probably familiar with global positioning system ("GPS") information 50, which is collected or determined by many mobile devices and smartphones. However, GPS signals are sometimes not receivable indoors. So, as the smartphone 32 roams a home or business, there may be instances or locations in which walls or ceilings prevent reception of the GPS signals. Exemplary embodiments, then, may use any indoor positioning system. There are many techniques for determining the indoor location 34 of the smartphone 32. FIG. 2 for example, illustrates a presence sensor 52 that monitors the room 22. The presence sensor 52 determines or senses when the smartphone 32, and/or a user of the smartphone 32, enters the room 22. The reader may be familiar with infrared or ultrasonic sensors that detect electromagnetic or motion presence. Other indoor positioning systems may send/receive electromagnetic signals to/from the smartphone 32. Because most readers are generally familiar with the global positioning system, this disclosure will mostly explain the GPS information 50. The reader should understand, though, that exemplary embodiments may use any indoor or outdoor locational system. Regardless, once the location 34 associated with the user and/or her smartphone 32 is determined, the user's profile 40 may be retrieved and the room 22 heated or cooled to the her preferred temperature value 46 and humidity value 48.

Figure 3:
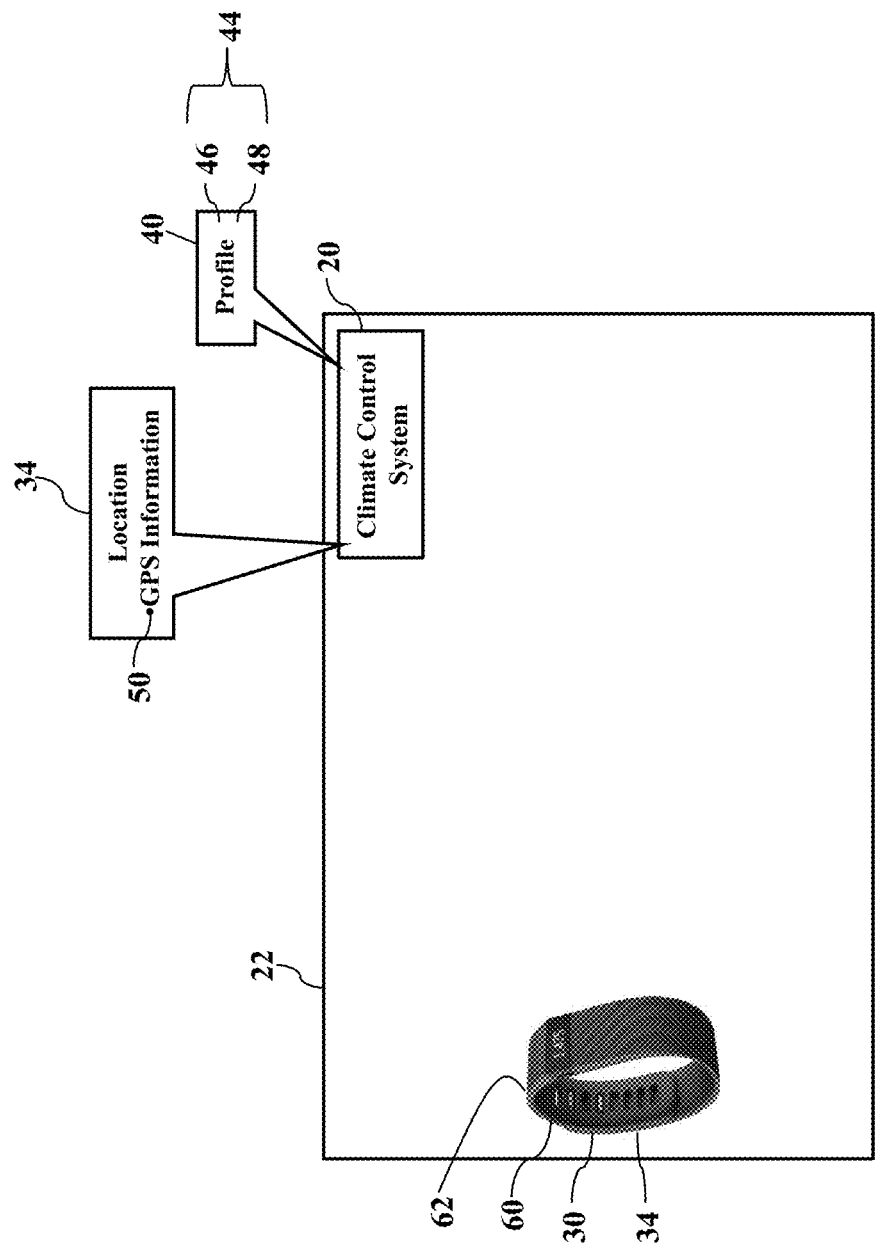

FIG. 3 illustrates wearable technology. Here the mobile device 30 is illustrated as a smart band 60, such as a fitness monitor or a watch. The smart band 60 may include a skin sensor 62. The skin sensor 62 may measure or monitor a temperature and/or a conductivity (sweat) associated with the user's skin. The skin sensor 62 generates an output signal which may be interpreted to indicate the user's activity (such as sleeping or exercising). The climate control system 20 identifies the skin sensor 62 and obtains the output signal, or its interpretation, to heat or cool to the profile 40. Moreover, the climate control system 20 may also obtain or determine the location 34 associated with the smart band 60. For example, the smart band 60 may self-report its current GPS information 50 using an integrated GPS transmitter (not shown for simplicity). However, the smart band 60 may also be detected and tracked using any indoor positioning system. Regardless, as the smart band 60 moves into the room 22, the climate control system 20 follows the location 34 and heats or cools to the profile 40.

Figure 4:
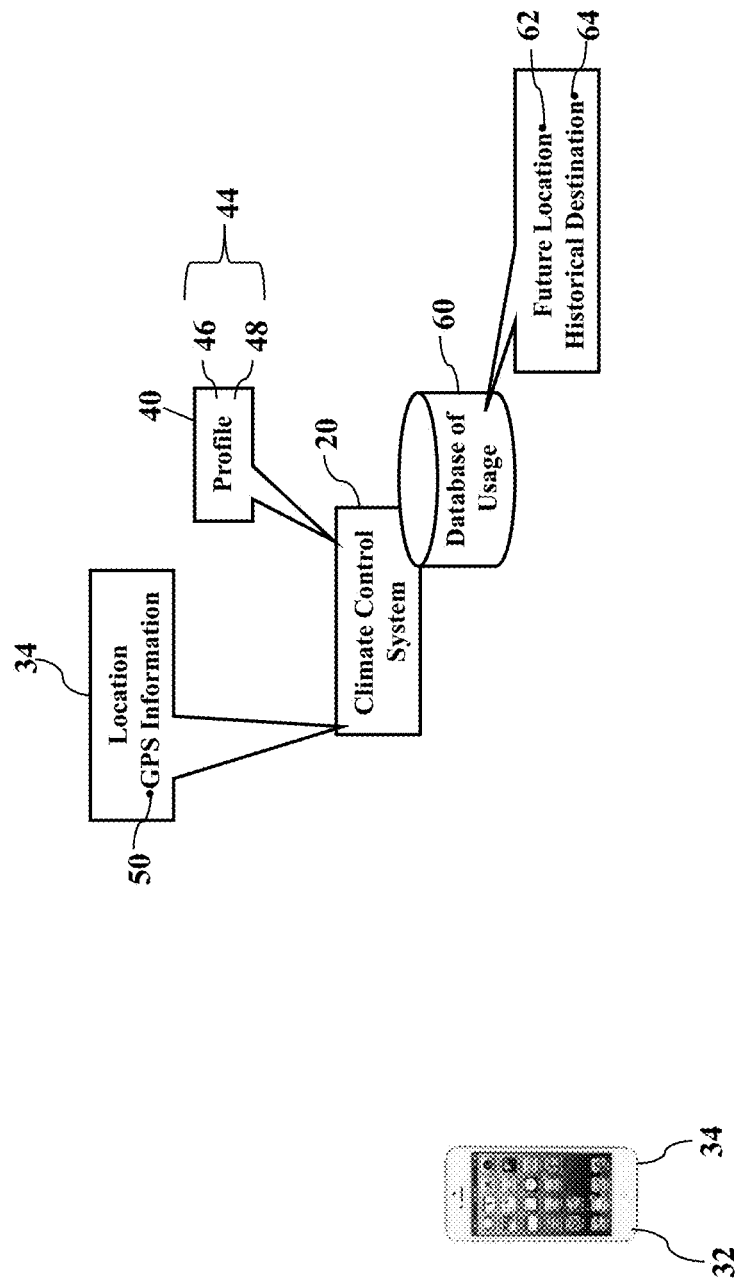

FIG. 4 illustrates locational anticipation. Here the climate control system 20 may predict where heating or cooling is needed, based on the location 34. The climate control system 20 obtains the location 34 associated with the mobile device 30, such as the smartphone 32 (as earlier explained). The climate control system 20 may then query a database 60 of usage. The database 60 of usage tracks the historical movements and usage of the smartphone 32 (which later paragraphs will explain in greater detail). In simple words, the database 60 of usage may store long-term records of the movements and usage of the smartphone 32. The climate control system 20 may query the database 60 of usage for the location 34 (such as the GPS information 50) and retrieve historical usage associated with that same location 34. For example, the climate control system 20 may predict or infer a future location 62. If the smartphone's recent locational reports match one or more historical entries, then the climate control system 20 may infer that the smartphone 32 is moving along a path historically observed. The climate control system 20 may thus predict the future location 62 based on a familiar route to a historical destination 64 previously logged in the database 60 of usage. The climate control system 20 may thus begin conditioning the future location 62 in anticipation of the user's arrival. The future location 62 may thus be a bedroom, kitchen, or other historical destination.

Figure 5:
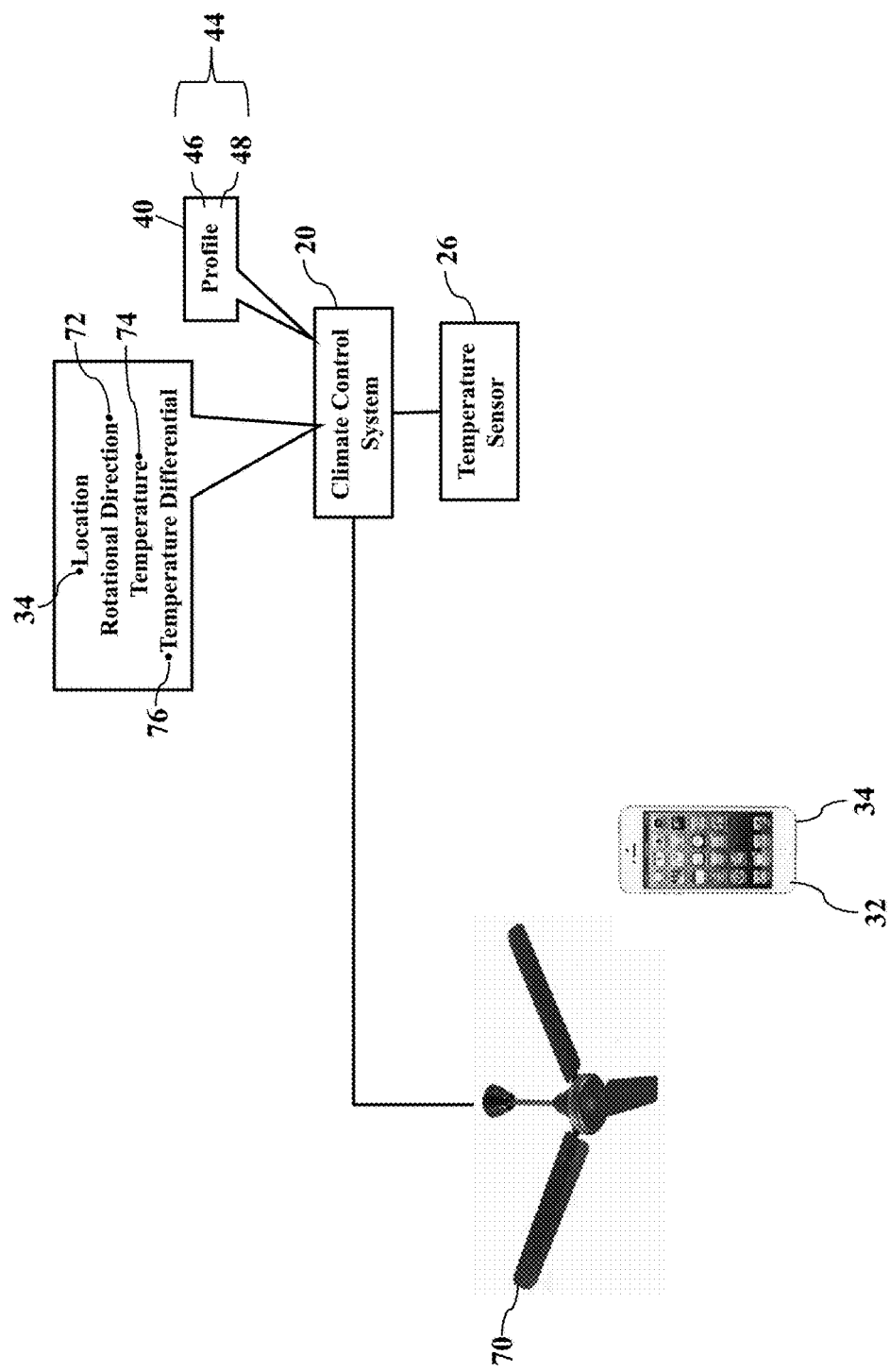

FIG. 5 illustrates a familiar example. The reader likely recognizes a ceiling fan 70 that is installed in many homes and businesses. When the ceiling fan 70 operates, the ceiling fan 70 provides a warming or cooling effect, depending on its rotational direction 72. Here, then, the climate control system 20 may activate the ceiling fan 70 that serves the location 34 associated with the user's smartphone 32. The climate control system 20 may then control the rotational direction 72 of the ceiling fan 70 to provide a warming or cooling effect. That is, the rotational direction 72 may be selected based on the user's preferred settings 44 in her profile 40. As FIG. 5 illustrates, the climate control system 20 obtains a temperature 74 generated by the temperature sensor 26. The temperature 74 is compared to the profile 40. If the temperature 74 matches or equals the user's preferred setting 44, then perhaps no conditioning is needed. However, if a temperature differential 76 is determined, then the climate control system 20 may the select the rotational direction 72 based on the temperature differential 76. Suppose, for example, the temperature differential 76 indicates the room 22 is too warm for the user's preferred setting 44. The climate control system 20 may select a counter-clockwise direction that causes the ceiling fan 70 to force ambient air downward for a cooling effect. However, if the temperature differential 76 indicates the room 22 is too cool, a clockwise direction may be selected to move warmer air downward for a warming effect. The climate control system 20 may thus instruct the ceiling fan 70 to activate or power on in the rotational direction 72. The ceiling fan 70 is thus commanded to warm or cool according to the user's profile 40.

Figure 6:
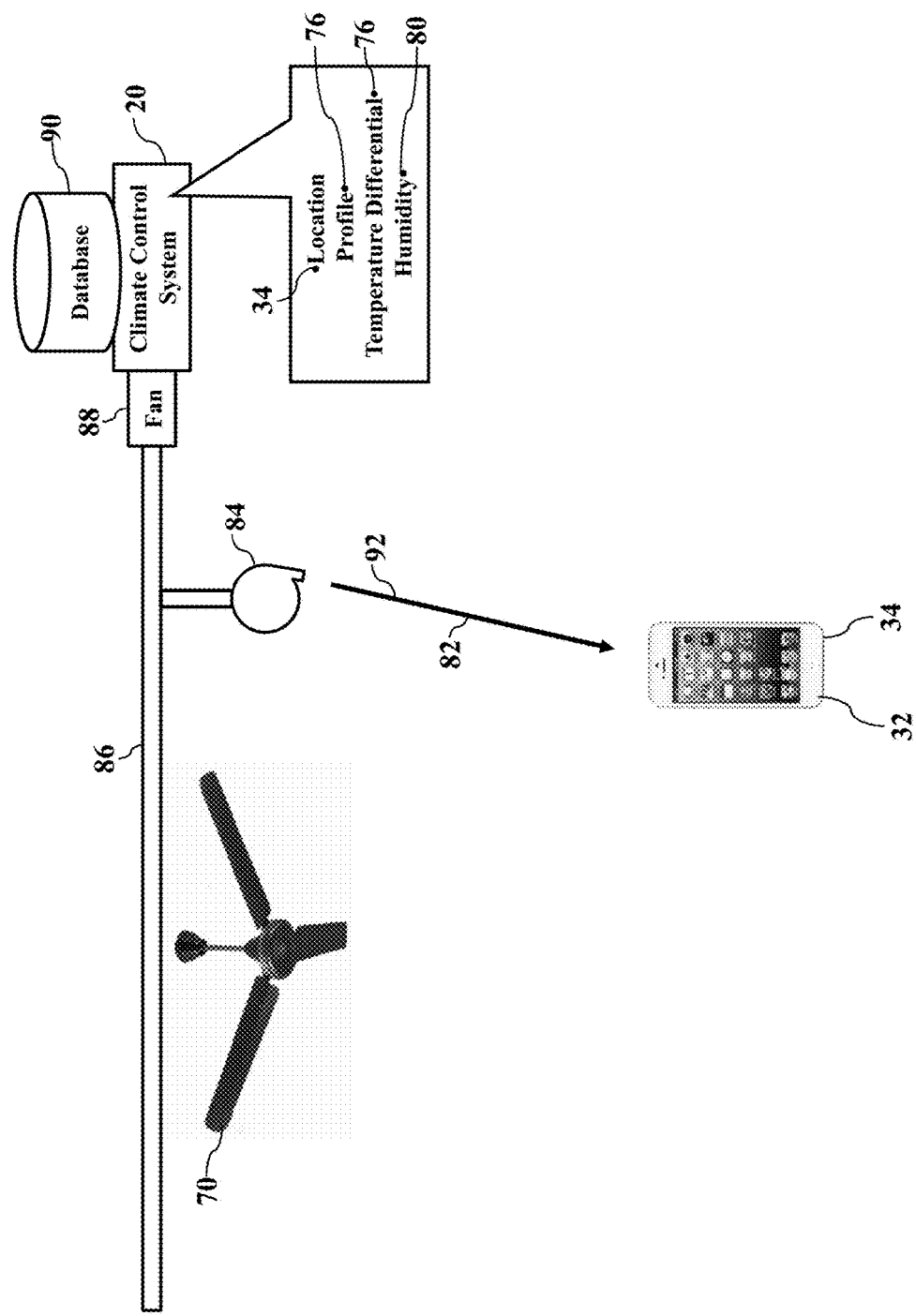

FIG. 6 illustrates additional conditioning. Here the climate control system 20 may determine the ceiling fan 70 is inadequate for the temperature differential 76. That is, the ceiling fan 70 may only overcome a maximum value of the temperature differential 76. A greater temperature differential 76 may require additional heating or cooling. Indeed, the ceiling fan 70 likely cannot overcome a humidity differential (as determined by a humidity 80 generated by the humidity sensor 28 illustrated in FIG. 1). The climate control system 20 may thus determine that conditioned air 82 (e.g., heated or cooled) is required to heat or cool to the user's profile 40.

Exemplary embodiments may select an air terminal 84. The reader likely understands that a home or business may have many registers, vents, or other air terminals 84 that exhaust the conditioned air 82. Once the location 34 is determined, exemplary embodiments may then select the air terminal 84 that corresponds to the user's location 34. The air terminal 84 thus supplies the conditioned air 82 fed by ductwork 86 from a fan 88. The climate control system 20 may consult an electronic database 90 to determine the air terminal 84 closest to the user's location 34. The climate control system 20, for example, queries the electronic database 90 for the user's location 34 and retrieves the corresponding air terminal 84. The climate control system 20 may then instruct the air terminal 84 to open, thus allowing the conditioned air 82 to output according to the user's location 34. Heated or cooled air thus flows into the room 22 to provide additional relief. When the temperature differential 76 approaches or equals zero, the climate control system 20 may instruct the air terminal 84 to close, thus stopping the output of the conditioned air 82.

Figure 7:
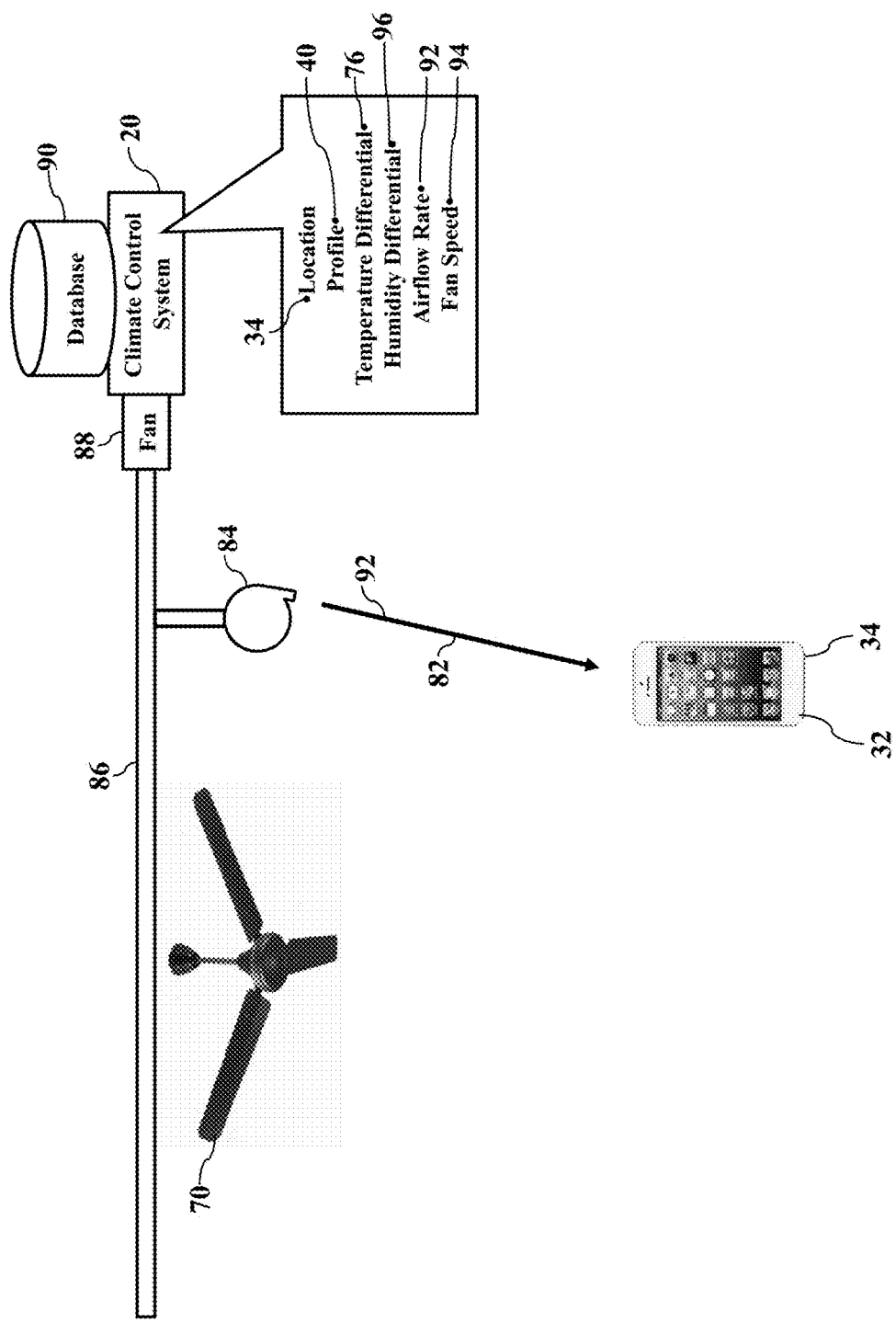

FIG. 7 illustrates an airflow rate 92. Here the climate control system 20 may control the fan 88 according to a sensory differential from the user's profile 40. That is, a fan speed 94 associated with the fan 88 may be based on the ambient conditions (e.g., the temperature differential 76 and/or a humidity differential 96). Higher or greater fan speeds 94 may be required for larger temperature differentials 76 and/or humidity differentials 96. Indeed, as the temperature differential 76 and/or the humidity differential 96 decreases, exemplary embodiments may reduce the fan speed 94. The climate control system 20 may thus repeatedly or periodically survey the output signals generated by the environmental sensors 24 (illustrated in FIG. 1) and compare to the user's profile 40. The climate control system 20 may then consult the electronic database 90 for the corresponding airflow rate 92 and the fan speed 94. Once the temperature differential 76 and/or the humidity differential 96 is determined, the climate control system 20 may query the electronic database 90 and retrieve the corresponding fan speed 94. The climate control system 20 may then command or control the fan 88 to the fan speed 94. So, as the temperature differential 76 and/or the humidity differential 96 approaches the user's preferred settings 44, exemplary embodiments may lower the fan speed 94 to reduce electrical consumption and to increase fan life.

Figure 8:
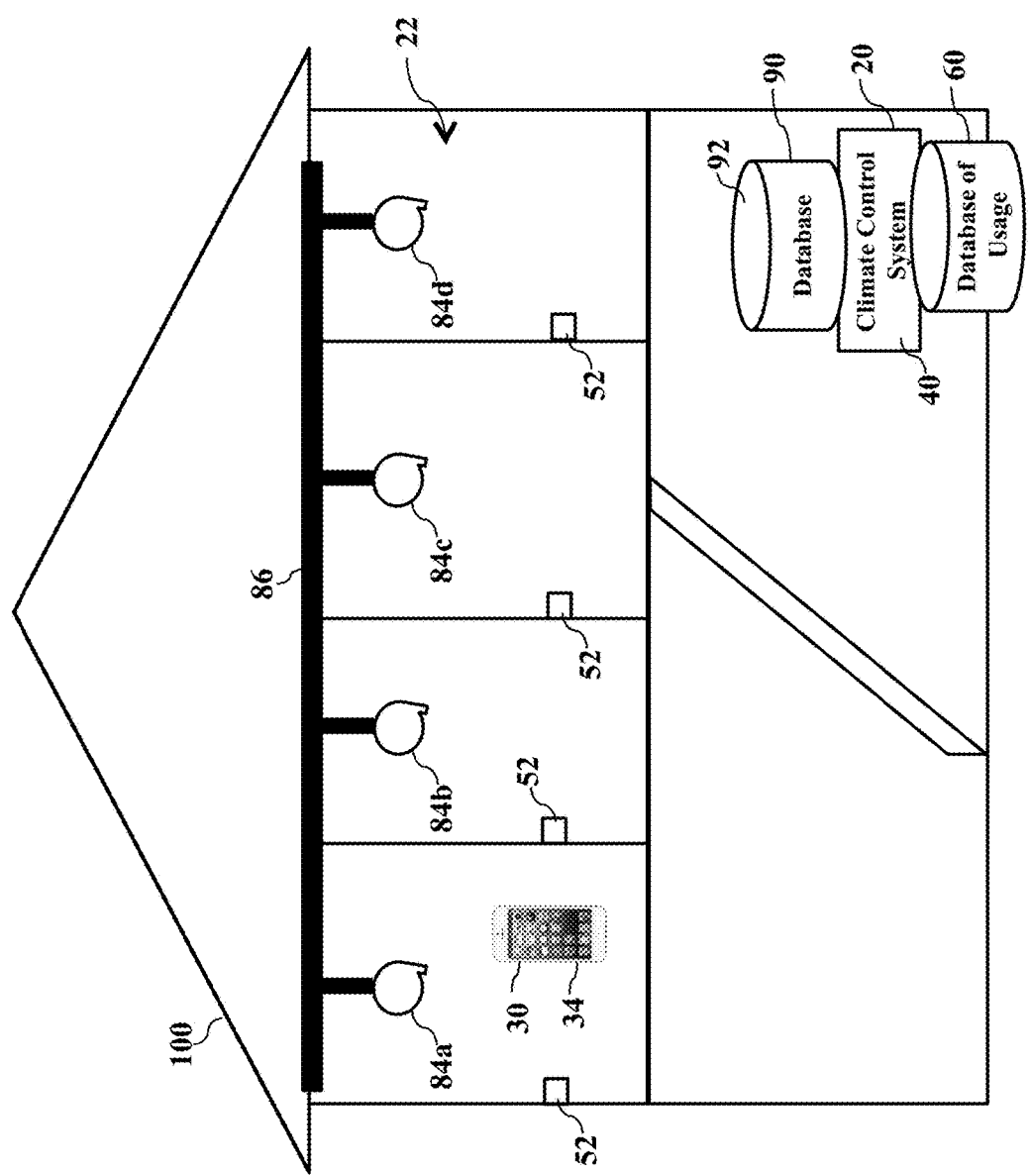

FIG. 8 illustrates an environmental ecosystem. Here exemplary embodiments may be applied to the climate control system 20 serving an entire building 100. As the reader understands, there are usually several different rooms 22 in a home or business. Each different room 22 may be served by one or more air terminals (illustrated as 84a-84d). As the occupant moves within the building 100, exemplary embodiments may track or monitor her location 34 based on her mobile device 30 and/or the presence sensors 52. The climate control system 20 may consult the database 60 of usage to predict the user's future location 62 (as explained with reference to FIG. 4) and anticipate the user's heating/cooling needs (based on the profile 40). The climate control system 20 may query the electronic database 90 to determine the air terminal 84 that corresponds to the current location 34 and/or the predicted future location 62. The climate control system 20 may event query the electronic database 90 to determine the airflow rate 92 that satisfies the profile 40. So, as the user moves throughout her home or business, the climate control system 20 follows her movements to maintain comfortable environments conditions.

Exemplary embodiments may track multiple occupants. The reader understands that homes and businesses may have several or even many family members, friends, and/or employees. As all these people move within the building 100, exemplary embodiments may track their respective locations 34 and heat/cool to their corresponding profiles 40. Indeed, as each individual moves within the building 100, the climate control system 20 may predict their individual destinations, select one or more of the serving air terminals 84, and heat or cool their destination. Exemplary embodiments may thus condition the rooms 22 that are actually being used. Unused rooms need not be conditioned, thus saving electricity and/or fuel.

Figure 9:
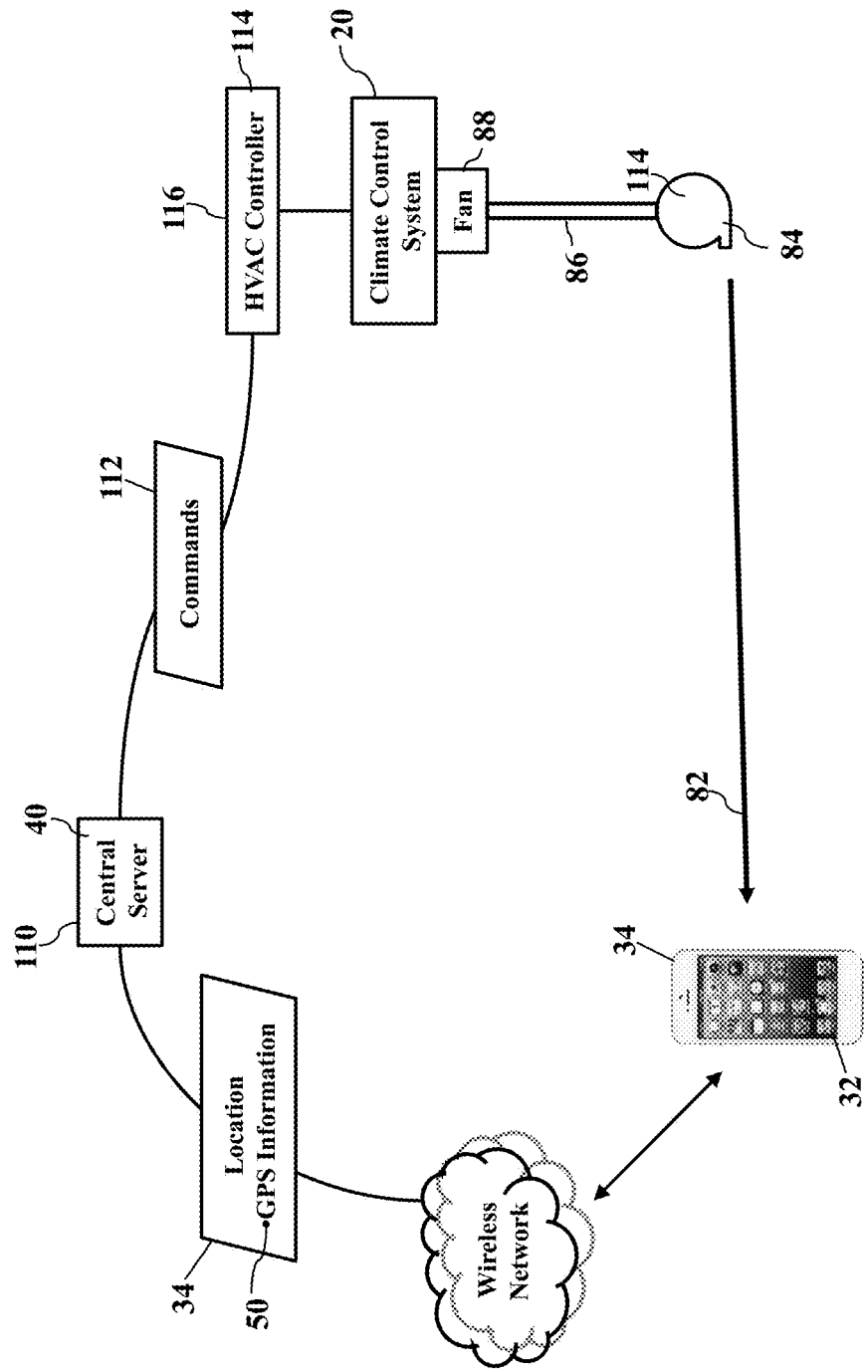

FIG. 9 illustrates network analysis. Here a central server 110 may provide a web-based climate control analysis based on the location 34 associated with the occupant's smartphone 32. Again, because the global positioning system is perhaps familiar to most readers, the central server 110 may obtain the GPS information 50 wirelessly reported by the smartphone 32. However, any locational scheme may be used. Once the location 34 is determined, the central server 110 may predict the user's destination (perhaps via the database 60 of usage illustrated in FIG. 4), select the serving air terminal 84 (via the electronic database 90 illustrated in FIGS. 6-7), and retrieve the user's profile 40. The central server 110 may then instruct the climate control system 20 to heat or cool to the profile 40 by outputting the conditioned air 82 via the selected air terminal 84. Here, then, the central server 110 may send or route commands 112 to one or more network addresses 114 associated with the climate control system 20. FIG. 9, for example, illustrates an HVAC controller 116 that controls the components of the climate control system 20. The HVAC controller 116 receives and executes the commands 112 to output the conditioned air 82 via the selected air terminal 84. The central server 110 may thus provide a cloud or Internet-based service to multiple HVAC systems. Residential and business climate control systems are thus relieved of the perhaps burdensome processing and calculations that are required to follow the movements of the users and/or their mobile devices 30. Moreover, the central server 110 provides a simple retrofit option for existing systems, which can be years or even decades old. A new climate control system may cost thousands of dollars, which is cost prohibitive, especially when still reliable. Exemplary embodiments, though, merely require retrofit of the motorized air terminal 84 and network interfacing, which is a relatively small cost.

Exemplary embodiments thus adapt to the smart home and mobile environment. As occupants move about their home, the climate control system 20 may track each occupant's location 34, perhaps based on their presence and/or their mobile devices 30. The climate control system 20 may then direct airflow to any location 34, thus providing immediate heating or cooling relief. Moreover, the climate control system 20 may retrieve the profile 40 and further heat or cool to any user's preferred settings 44. Energy consumption is greatly reduced, as unused rooms need not be heated or cooled.

Exemplary embodiments thus provide more efficient relief. Conventional HVAC systems provide only blunt control using one (1) thermostat. Even if the thermostat is programmable, conventional HVAC systems conventionally heat and cool all rooms, regardless of the occupants' locations. Here, though, exemplary embodiments track the locations 34 of the occupants and only condition occupied areas. Unused rooms may be starved of the conditioned air 82, thus conserving energy and increasing system life.

Figure 10:
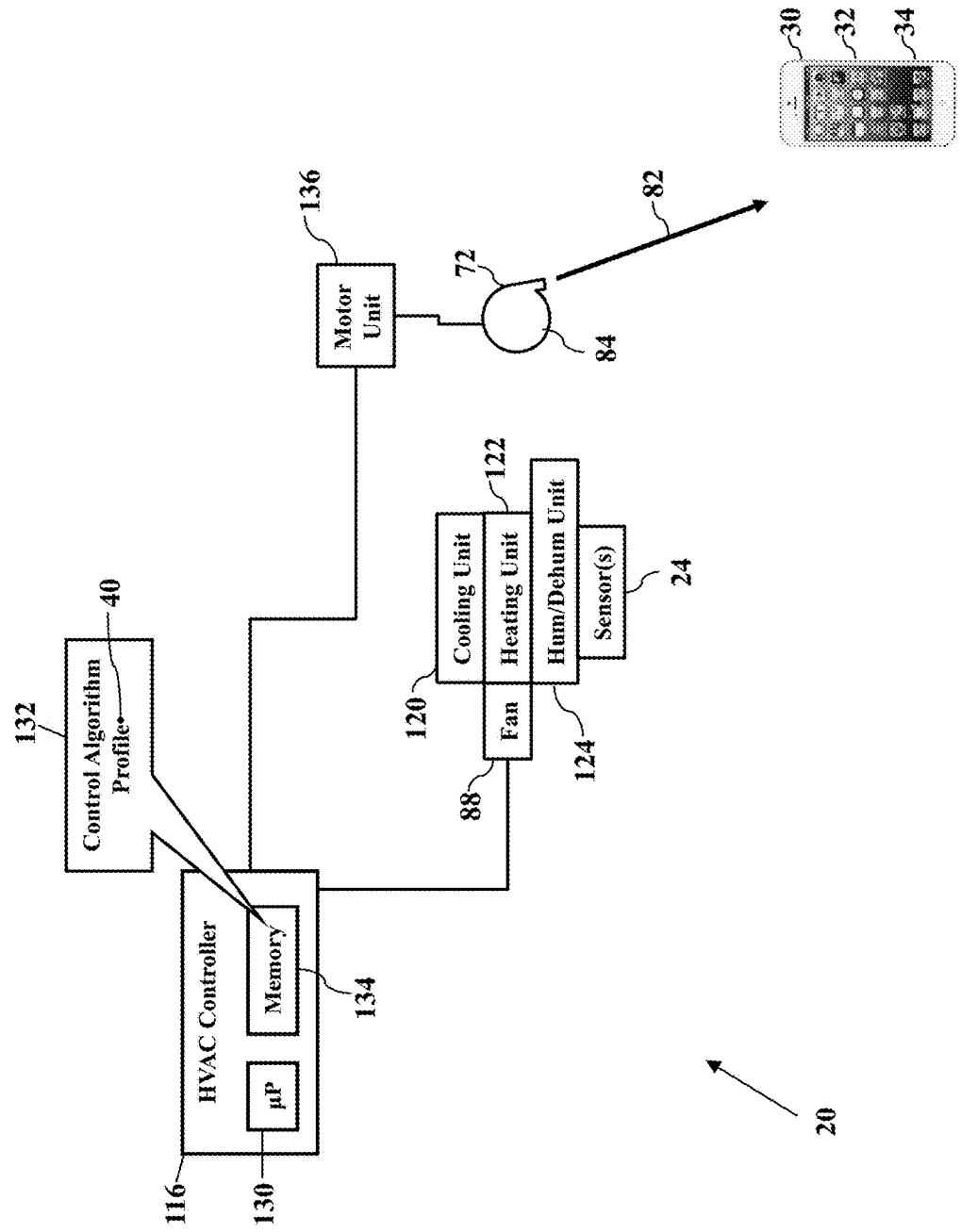
FIGS. 10-13 are more detailed illustrations of the operating environment, according to exemplary embodiments.

FIGS. 10-13 are more detailed illustrations of the operating environment, according to exemplary embodiments. FIG. 10 illustrates the basic operating components of the climate control system 20. Climate control systems are generally well known, so no detailed explanation is needed. FIG. 10, for simplicity, illustrates the HVAC controller 116 interfacing with a cooling unit 120, a heating unit 122, a humidifier/dehumidifier ("Hum/DeHum") unit 124, the fan 88, and the air terminal 84. The HVAC controller 116 has a processor 130 (e.g., "μP"), application specific integrated circuit (ASIC), or other component that executes a control algorithm 132 stored in a memory 134. The control algorithm 132 instructs the processor 130 to perform operations, such as retrieving any sensory data associated with the environmental sensor(s) 24. The control algorithm 132 may also instruct the processor 130 to retrieve the profile 40 associated with the occupant's smart device 30 (such as her smartphone 32). The control algorithm 132 compares environmental sensory data (such as the temperature 74 and humidity 80 illustrated in FIGS. 5-6) to the profile 40 and instructs the processor 130 to condition the environment, such as activating the cooling unit 120 to reduce the temperature 74 or activating the heating unit 122 to increase the temperature 74. The control algorithm 132 may also command a motor unit 136 associated with the air terminal 84, thus causing the air terminal 84 to open and output the conditioned air 82.

Figure 11:
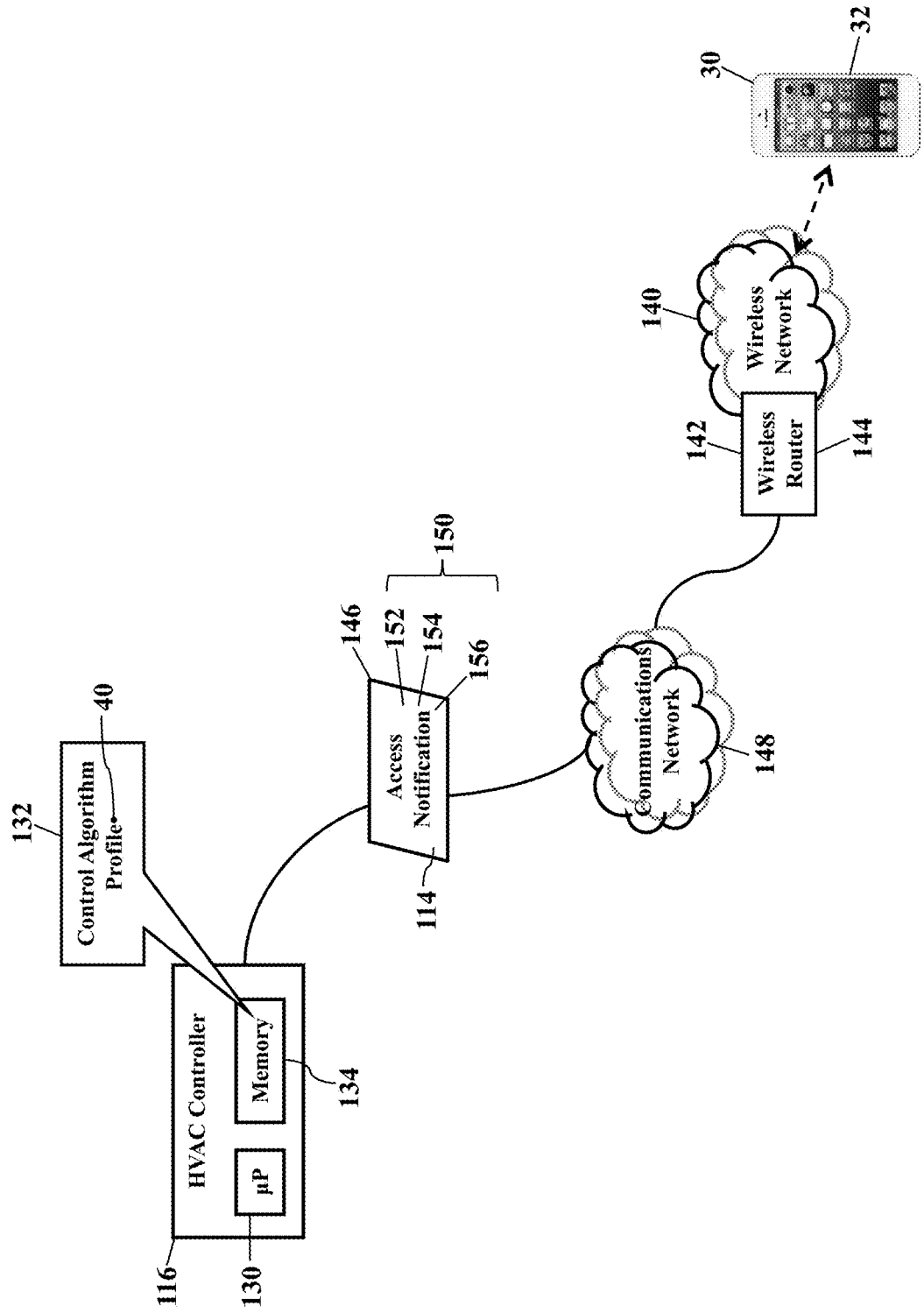

FIG. 11 illustrates device presence. Here exemplary embodiments may determine a network presence associated with the user's smartphone 32. When the smartphone 32 enters any area, the smartphone 32 may establish wireless communication with a wireless network 140 serving the area. The smartphone 32, for example, may request access or permission to a wireless local area network (such as WI-FI®), wide area cellular network, or any other network. The smartphone 32 may thus instruct its transceiver (not shown for simplicity) to wirelessly request access permission using the electromagnetic frequency band required by the wireless network 140. When the wireless network 140 detects the smartphone 32, exemplary embodiments may inform the HVAC controller 116. As FIG. 11 illustrates, the smartphone 32 may send an access request to an access device 142 serving the wireless network 140. FIG. 11 illustrates the access device 142 as a wireless router 144, which commonly serves many residential and business WI-FI® networks. However, the access device 142 may be any network interface to an access network, such as a gateway, cable modem, DSL modem, or cellular base station. Regardless, the smartphone 32 broadcasts a request that seeks access permission to the wireless network 140. When the access device 142 receives the access request, the access device 142 may send a packetized access notification 146 into a communications network 148 for routing and delivery to the network address 114 associated with the HVAC controller 116. The access notification 146 may thus alert the HVAC controller 116 to the radio frequency presence of the occupant's smartphone 32. The access notification 146 may further include information that uniquely identifies the smartphone 32, such as data representing a cellular identifier 150. While any alphanumeric combination may uniquely identify the smartphone 32, FIG. 11 illustrates the smartphone's cellular telephone number (or "CTN") 152, International Mobile Subscriber Identity (or "IMSI") 154, or Mobile Station International Subscriber Directory Number ("MSISDN") 156. Whenever the mobile smartphone 32 sends messages or information, the smartphone 32 may include or self-report the CTN 152, IMSI 154, and/or MSISDN 156.

Exemplary embodiments may packetize. As any component of the climate control system 20 may communicate with the communications network 148, any component (e.g., the HVAC controller 116, the cooling unit 120, the heating unit 122, the humidifier/dehumidifier unit 124, the fan 88, and/or the air terminal 84) may have a network interface. The network interface to the communications network 148 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 12:
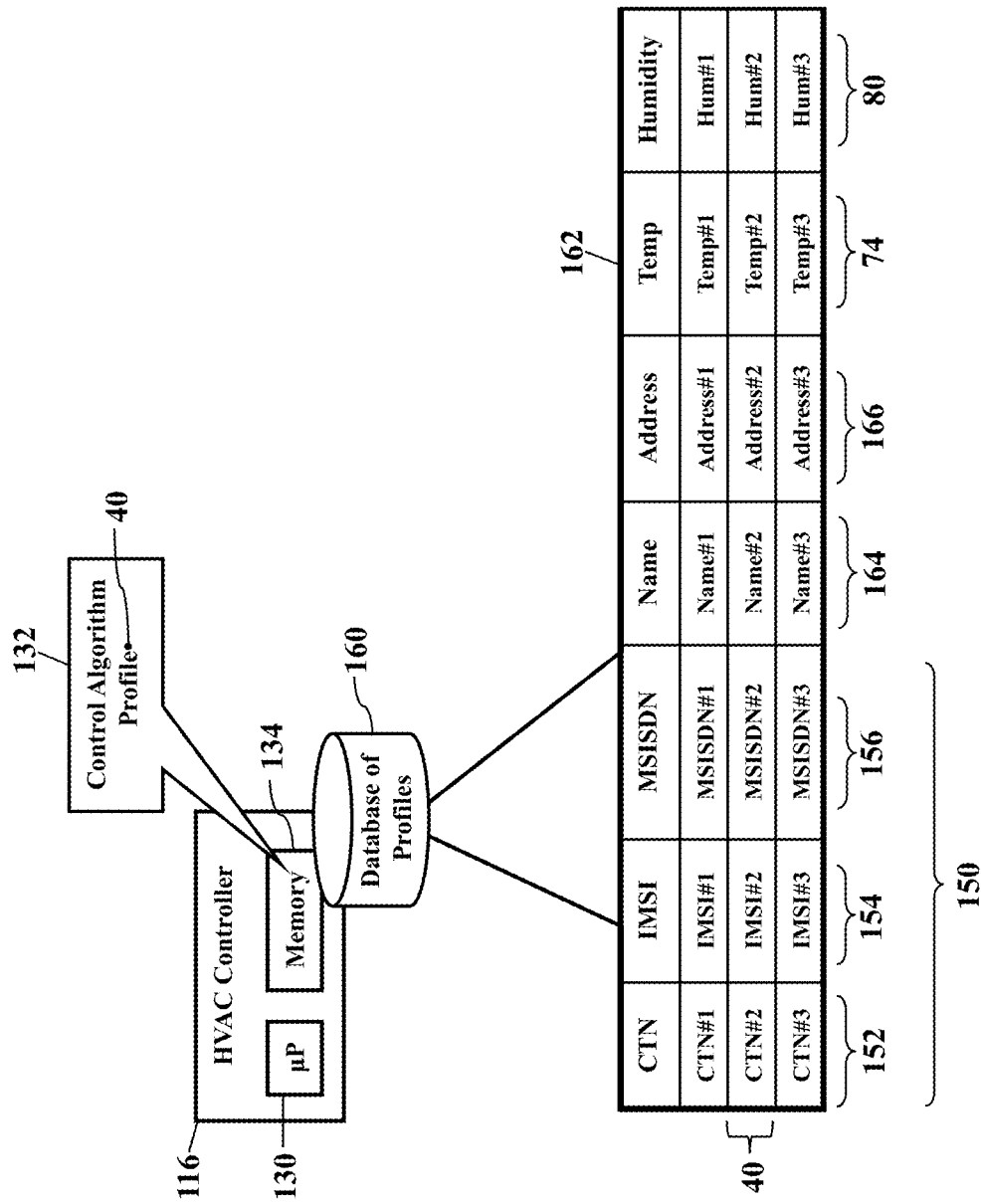

FIG. 12 illustrates profile determination. When the HVAC controller 116 determines the network presence of the user's smart device 30, the HVAC controller 116 may retrieve the corresponding profile 40. The HVAC controller 116, for example, may query an electronic database 160 of profiles for a matching entry. FIG. 12 thus illustrates the database 160 of profiles as a table 162 having electronic database associations between different profiles 40 and different device identifiers. FIG. 12 illustrates the cellular identifier 150, as many readers are familiar with cellular telephone numbers ("CTN") 152. Device identifiers, though, may be any unique alphanumeric combination. Regardless, the HVAC controller 116 may query for a profile entry that matches the CTN 152, the IMSI 154, and/or the MSISDN 156 detailed in the access notification 146 (illustrated in FIG. 11). If the database 160 of profiles contains a matching entry, then the HVAC controller 116 retrieves the corresponding profile 40 and its preferred settings 44 (such as the temperature 74 and the humidity 80). However, the profile 40 may include any other information, such as an identifying name 164 and address 166. While FIG. 12 only illustrates a few different profiles 40, in actual practice the electronic database 160 of profiles may store many entries for all the occupants and even guests. Moreover, while the database 160 of profiles is illustrated as locally stored in the memory 134 of the HVAC controller 116, the database 160 of profiles may be remotely stored and accessed via the communications network 148 (also illustrated in FIG. 11). A network central or centric implementation may thus have hundreds or even thousands of entries for hundreds or thousands of different mobile devices.

Figure 13:
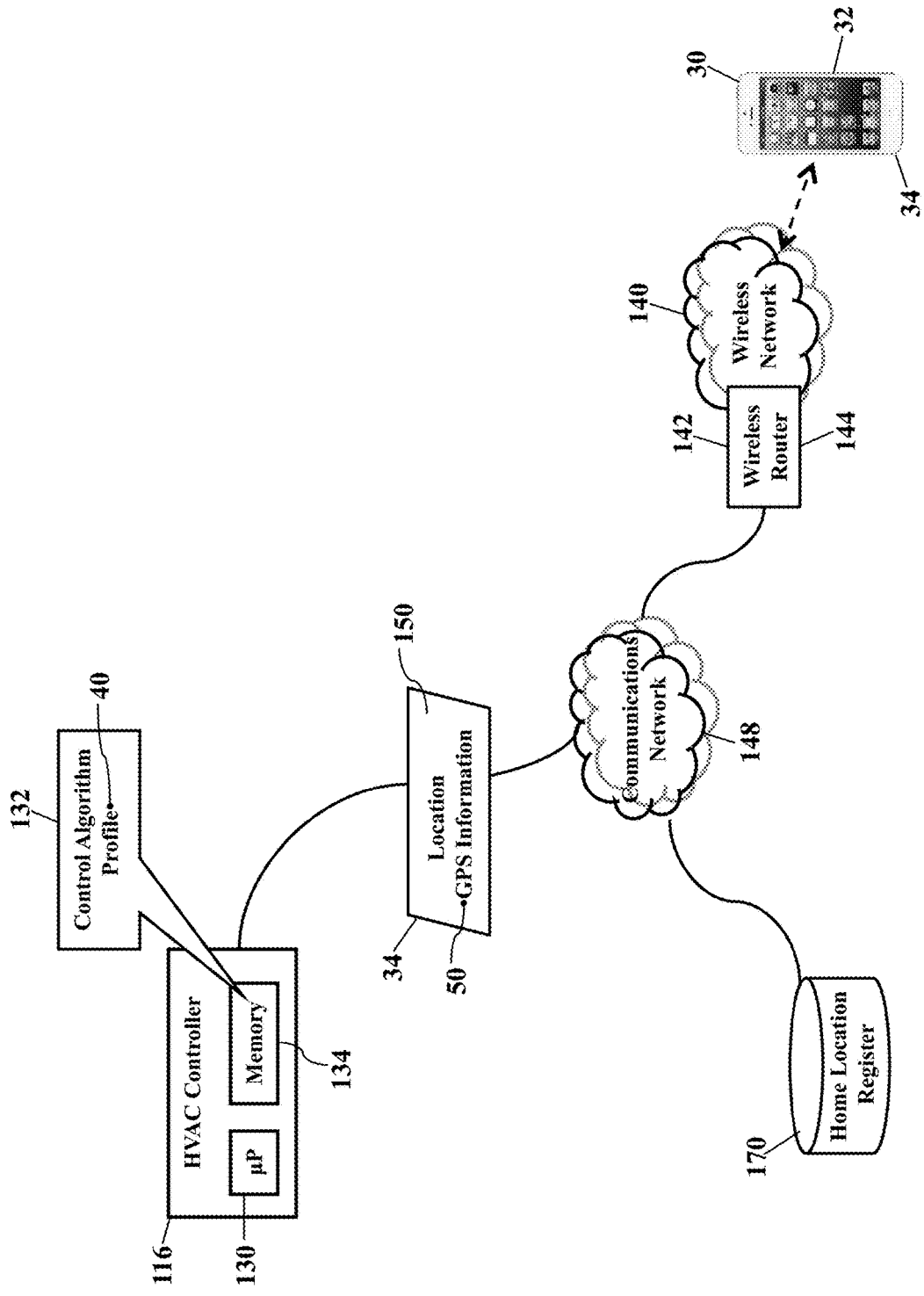

FIG. 13 illustrates locational determination. Here exemplary embodiments determine the location 34 associated with the user's smart device 30 (again illustrated as the smartphone 32). For example, once the smartphone 32 joins the wireless network 140, the smartphone 32 may randomly or periodically report its global positioning system ("GPS") information 50 (perhaps along with its device identifier 150). The HVAC controller 116 may optionally query the smartphone 32 for its GPS information 50. The HVAC controller 116 may also query a home location register 170 or other cellular network component for the current location 34 associated with the cellular identifier 150 (e.g., CTN 152, IMSI 154, and/or MSISDN 156 illustrated in FIGS. 11-12). Again, because the global positioning system is perhaps familiar to most readers, this disclosure primarily explains the GPS information 50. However, exemplary embodiments may utilize any indoor or outdoor locational scheme known or determined in the future. As locational positioning is generally known, no detailed explanation is needed.

Figure 14:
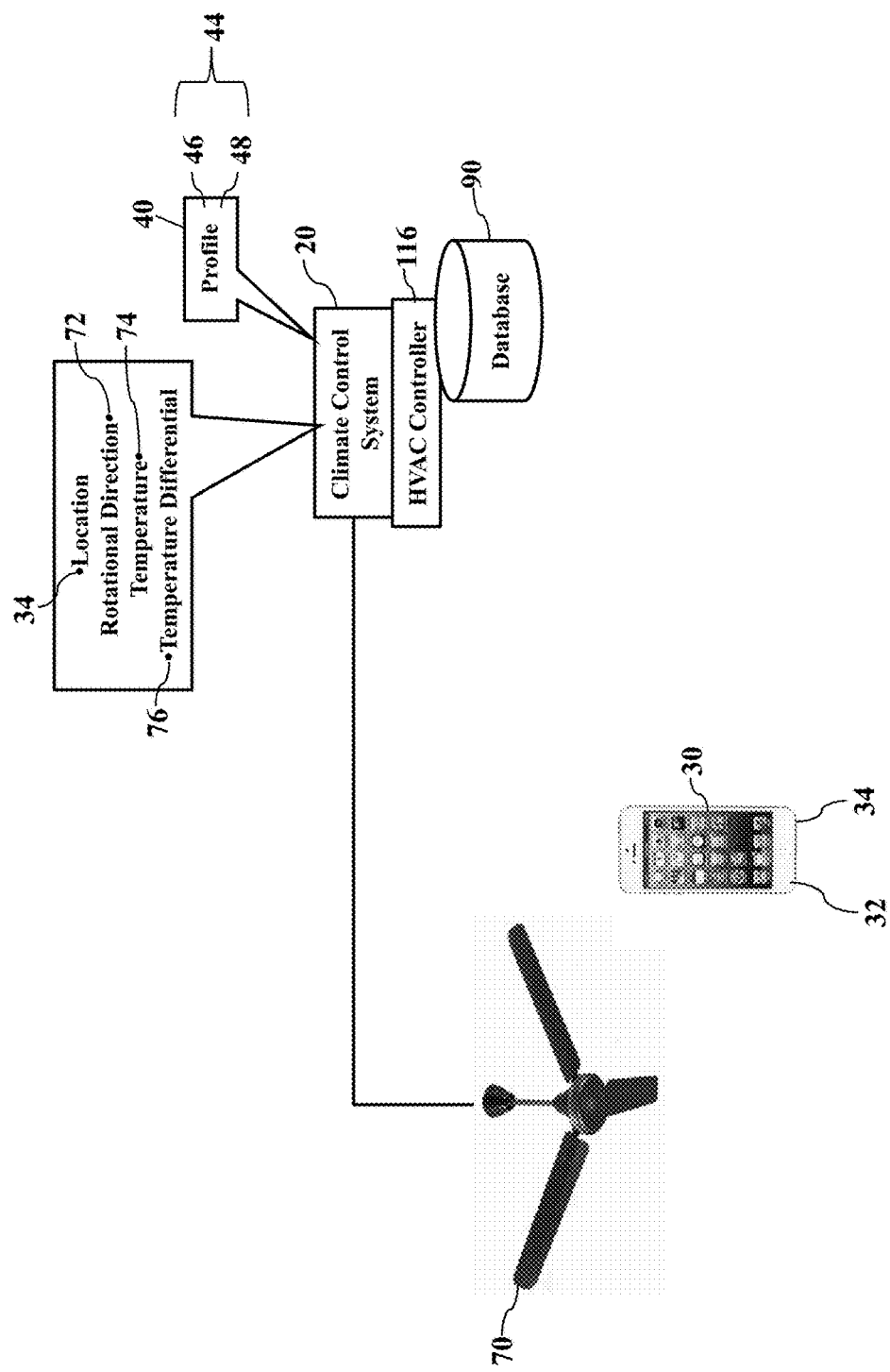
FIGS. 14-16 illustrate fan conditioning, according to exemplary embodiments.
Figure 15:
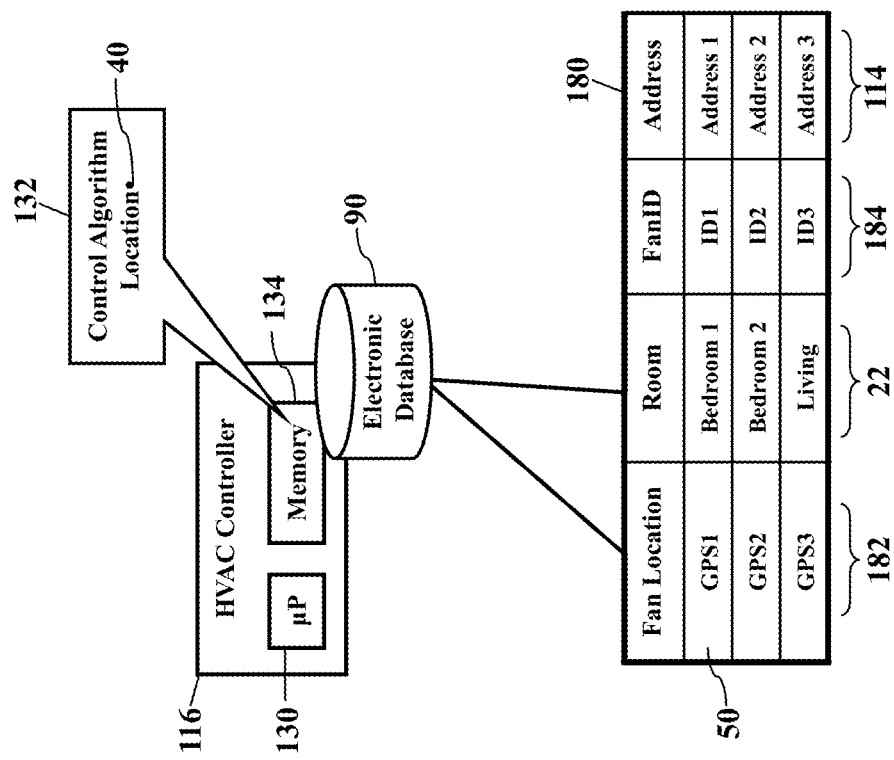
Figure 16:
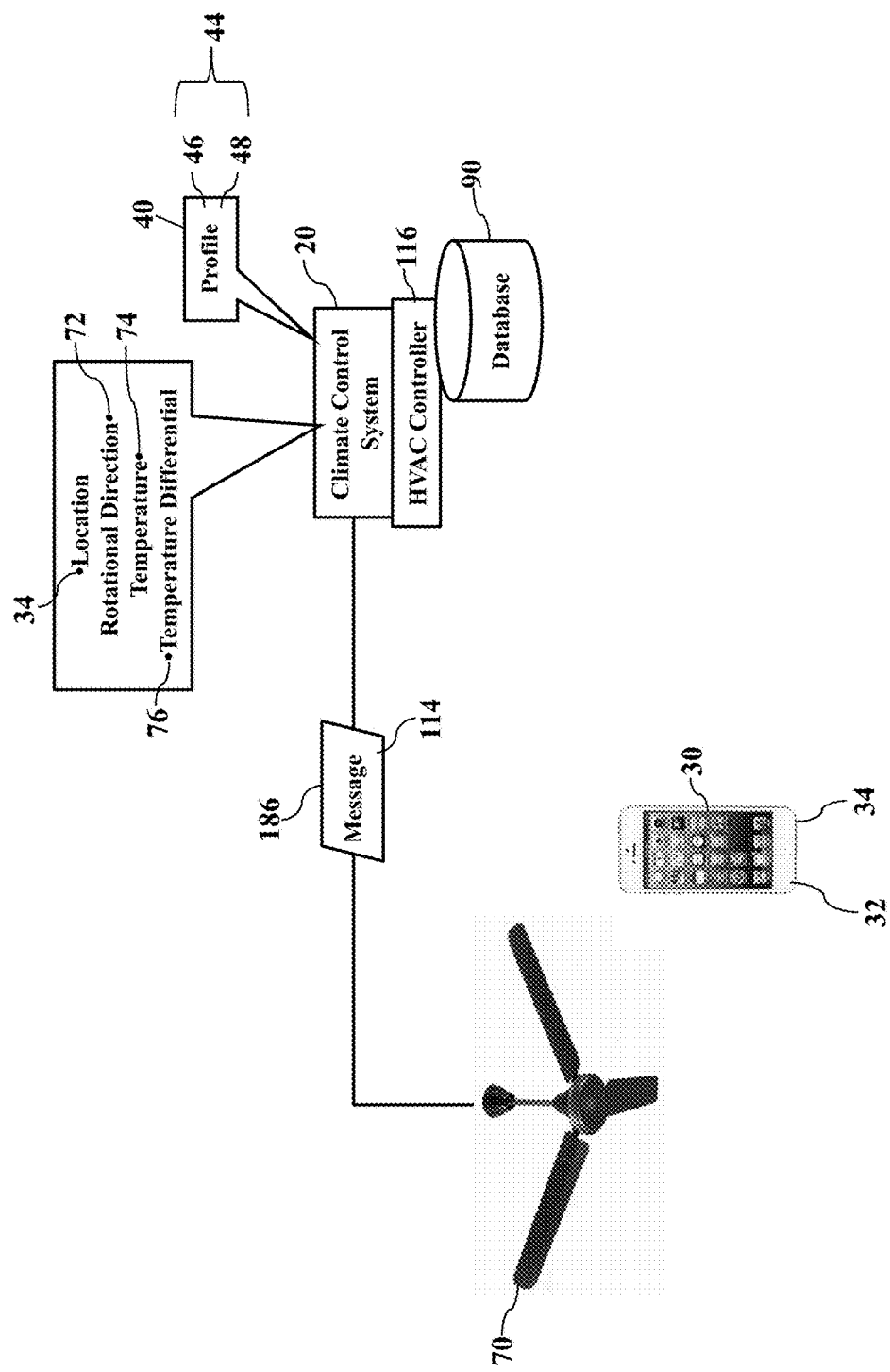

FIGS. 14-16 illustrate fan conditioning, according to exemplary embodiments. Here the climate control system 20 may activate the appropriate ceiling fan 70 to warm or cool the location 34 associated with the user's mobile device 30 (such as her smartphone 32). The HVAC controller 116, for example, may consult the electronic database 90. The electronic database 90 may store entries representing the different ceiling fans 70 operable by the climate control system 20. The reader may realize that some homes and businesses may have a different ceiling fan 70 in different rooms, especially homes and businesses in warmer climates. The ceiling fans 70 are likely much less expensive to operate, so the HVAC controller 116 may be configured or programmed to first activate the ceiling fan 70 for inexpensive relief. The HVAC controller 116 may thus query the electronic database 90 for the location 34 associated with the user's smartphone 32 and retrieve any matching entries.

FIG. 15 illustrates the electronic database 90. Here the electronic database 90 is illustrated as a table 180 that electronically maps, relates, or associates different fan locations 182 to their installed rooms 22 and/or to different ceiling fans 70. That is, the electronic database 90 may store different fan locations 182 associated with any of the ceiling fans 70. Each fan location 182, for simplicity, may thus be represented with its own corresponding GPS coordinates or information 50. When the ceiling fan 70 is installed, the electronic database 90 may be configured to store the GPS information 50 of the installed location. So, once the location 34 (associated with the smartphone 32) is known, the HVAC controller 116 may query the electronic database 90 for any entry having an electronic database association with the query search term. The HVAC controller 116, for example, may retrieve a fan identifier ("FanID") 184 that uniquely identifies the ceiling fan 70 having an installed location that matches the location 34 of the smartphone 32. The HVAC controller 116 may also retrieve the network address 114 that is assigned to the ceiling fan 70. Exemplary embodiments may thus determine the ceiling fan 70 that serves the location 34 (such as the GPS information 50) associated with the smartphone 32. The electronic database 90 is illustrated as being locally stored in the memory 134 of the HVAC controller 116, but some or all of the database entries may be remotely maintained at some other server or location in the communications network (illustrated as reference numeral 148 in FIGS. 11 and 13).

FIG. 16 illustrates activation. Here the HVAC controller 116 may power on the ceiling fan 70 to provide warming or cooling relief. Once the ceiling fan 70 associated with the location 34 is known (as explained with reference to FIG. 15), exemplary embodiments may determine the rotational direction 72. The HVAC controller 116 obtains the temperature 74 associated with the location 34, compares to the user's profile 40, and determines the temperature differential 76. The HVAC controller 116 may then select the rotational direction 72 based on the temperature differential 76 (as explained with reference to FIG. 5). The HVAC controller 116 may thus instruct, activate, and/or power on the ceiling fan 70 in the rotational direction 72. The ceiling fan 70 is thus commanded to warm or cool according to the user's profile 40. The HVAC controller 116, for example, may send an electronic message 186 to the network address 114 retrieved from the electronic database 90. The electronic message 186 includes an instruction or command for the ceiling fan 70 to power on and spin according to the rotational direction 72. The ceiling fan 70 may thus have a network interface (not shown for simplicity) to the communications network (illustrated as reference numeral 148 in FIGS. 11 and 13). The HVAC controller 116 may then periodically re-evaluate the temperature differential 76 to determine an effectiveness of the ceiling fan 70.

Figure 17:
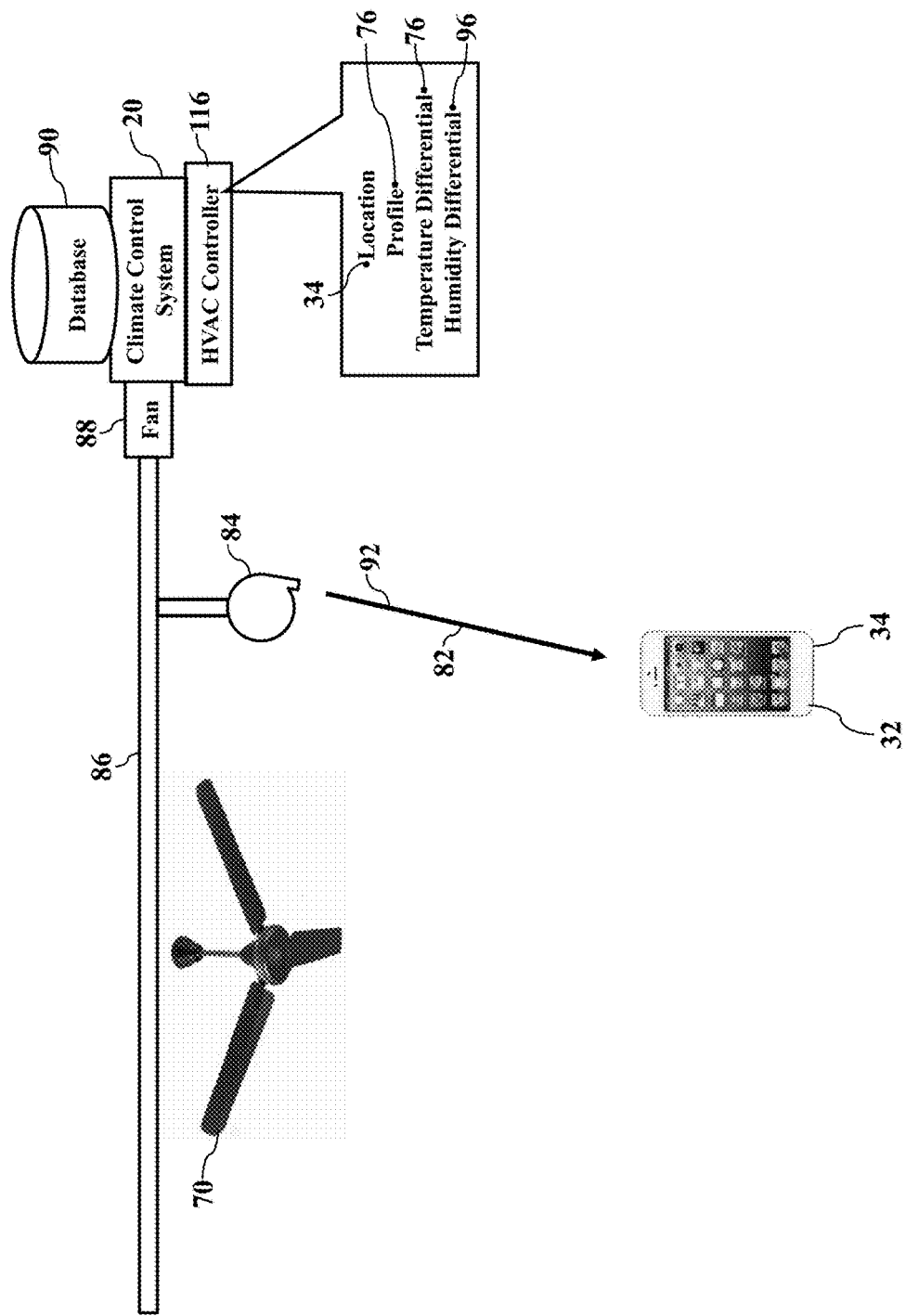
FIGS. 17-19 illustrate additional conditioning, according to exemplary embodiments.
Figure 18:
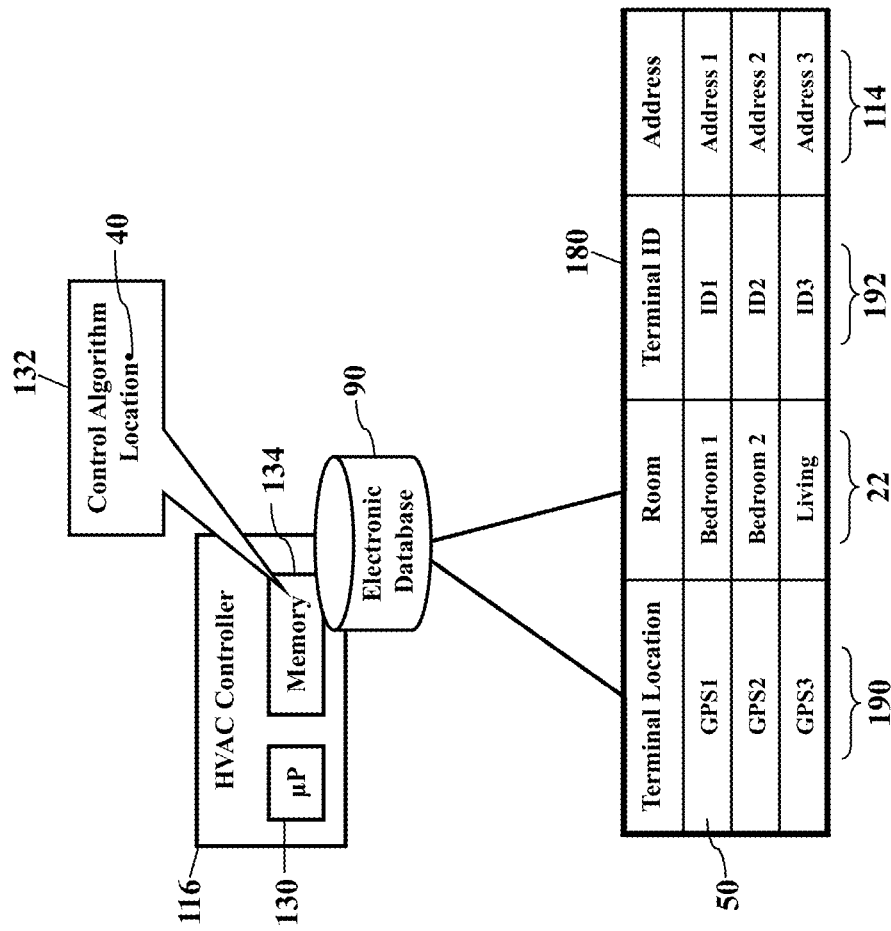
Figure 19:
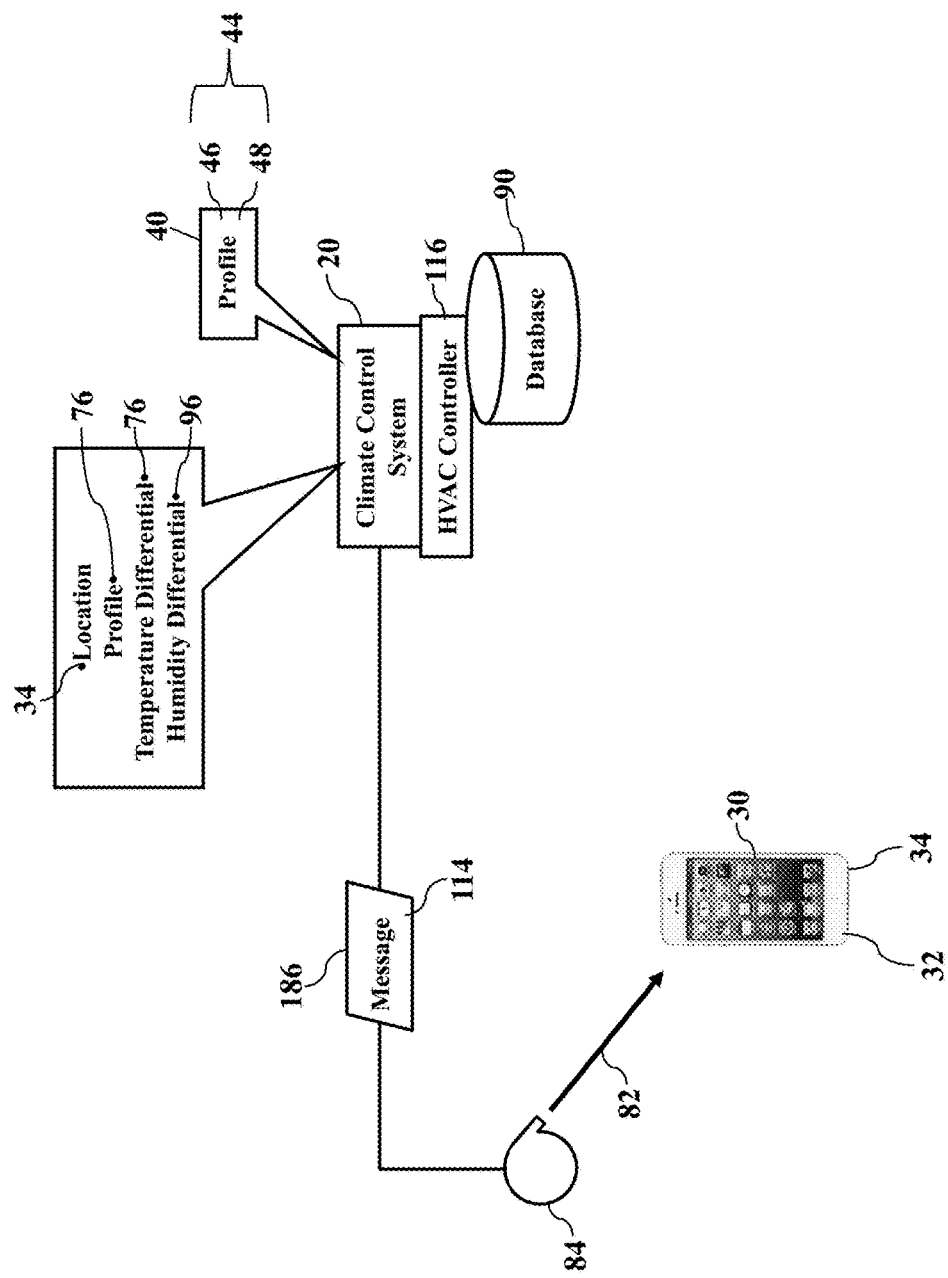

FIGS. 17-19 illustrate additional conditioning, according to exemplary embodiments. As the reader may understand, there may be instances in which the ceiling fan 70 is inadequate. The ceiling fan 70, in simple words, cannot overcome the temperature differential 76 and/or the humidity differential 96. Exemplary embodiments may determine that the conditioned air 82 (e.g., heated or cooled) is required to heat or cool to the user's profile 40. Exemplary embodiments may thus select the appropriate air terminal 84 to exhaust the heated/cooled conditioned air 82 for additional environmental relief. Here, then, the electronic database 90 may have additional entries for the different air terminals 84 in the home or business. That is, once the location 34 is determined, the HVAC controller 116 may query the electronic database 90 for the air terminal 84 that serves the same or similar location 34.

FIG. 18 again illustrates the electronic database 90. Here the electronic database 90 may have entries for different terminal locations 190 associated with any of the air terminals 84 outputting conditioned air generated by the climate control system 20. Each terminal location 190, for simplicity, may thus again be represented with the GPS coordinates or information 50. After the air terminal 84 is installed, the electronic database 90 may be configured to store its corresponding GPS information 50 representing the installed location. So, once the location 34 (associated with the smartphone 32) is known, the HVAC controller 116 may query the electronic database 90 for any entry having an electronic database association with the query search term. The HVAC controller 116, for example, may retrieve a description of the room 22 in which the air terminal 84 serves. The HVAC controller 116 may retrieve a terminal identifier ("Terminal ID") 192 that uniquely identifies the air terminal 84 having an installed location that matches the location 34 of the smartphone 32. The HVAC controller 116 may also retrieve the network address 114 that is assigned to the air terminal 84. Exemplary embodiments may thus determine the air terminal 84 that serves the location 34 (such as the GPS information 50) associated with the smartphone 32.

FIG. 19 illustrates conditioning. Once the air terminal 84 is determined, the air terminal 84 is commanded to output the conditioned air 82. The HVAC controller 116, for example, may send the electronic message 186 to the network address 114 retrieved from the electronic database 90. The electronic message 186 includes an instruction or command for the air terminal 84 to open, thus outputting the conditioned air 82 to the area associated with the location 34 of the smartphone 32. The air terminal 84 may thus have a network interface (not shown for simplicity) to the communications network (illustrated as reference numeral 148 in FIGS. 11 and 13). Heated or cooled air thus flows from the air terminal 84 to provide relief. The HVAC controller 116 may then periodically re-evaluate the ambient environmental conditions (such as the temperature differential 76 and/or the humidity differential 96) to determine an effectiveness of the conditioned air 82. At some point the HVAC controller 116 may instruct the air terminal 84 (perhaps via the electronic message 186) to close.

Figure 20:
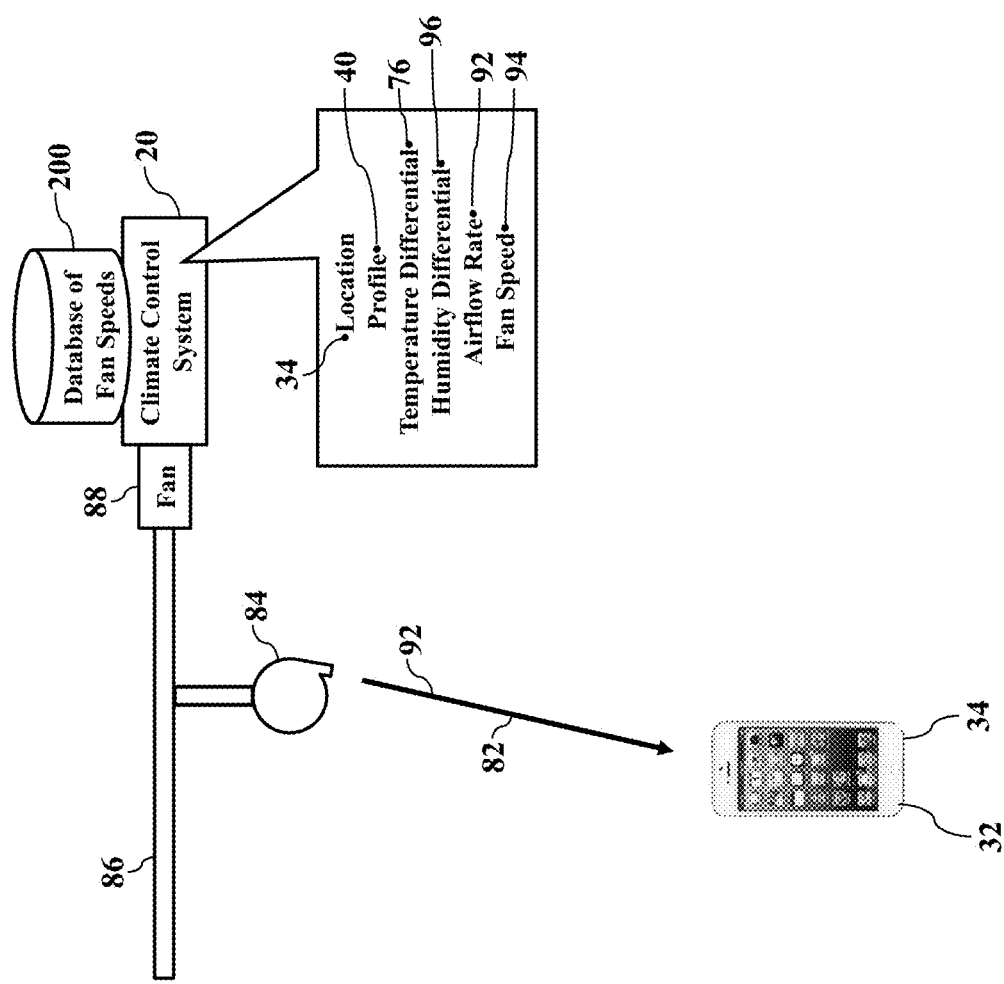
FIGS. 20-24 illustrate an airflow rate, according to exemplary embodiments.
Figure 21:
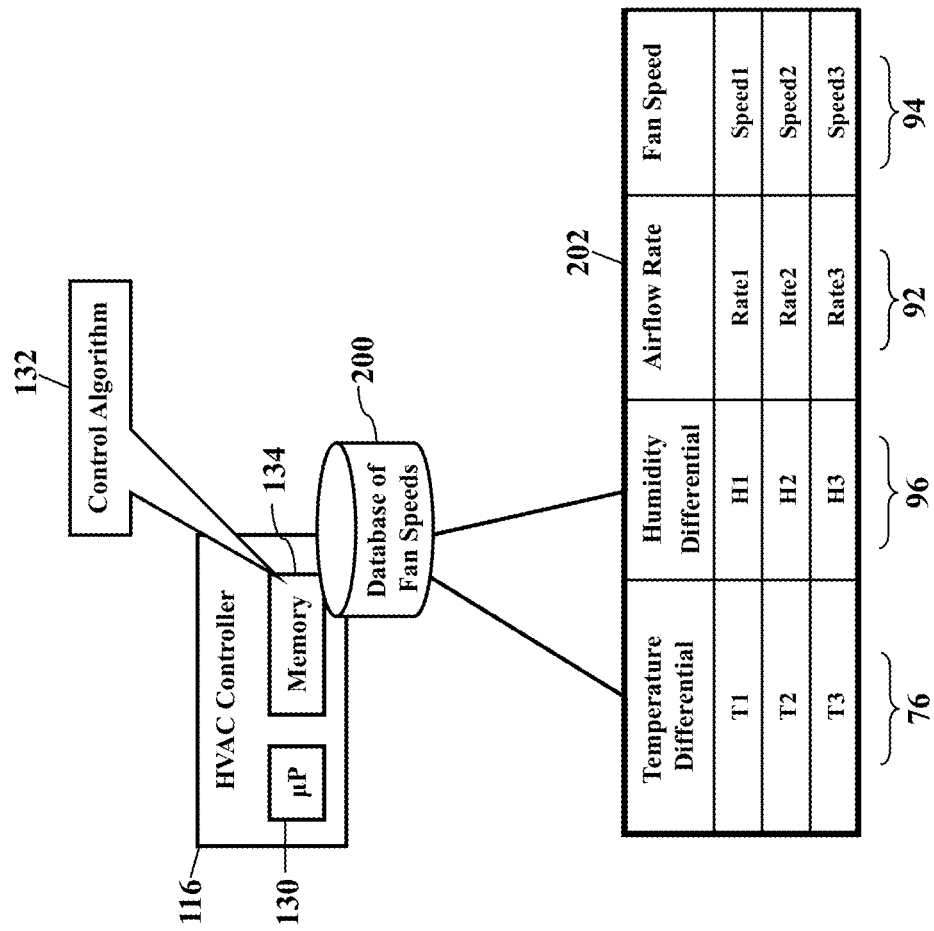

FIGS. 20-21 illustrate the airflow rate 92, according to exemplary embodiments. Here the HVAC controller 116 may control the fan speed 94 to provide environmental relief. The fan speed 94, for example, may be based on the temperature differential 76 and/or the humidity differential 96. Higher or greater fan speeds 94 may be required for larger differentials 76 and 96. Exemplary embodiments, though, may reduce the fan speed 94 as the temperature differential 76 and/or the humidity differential 96 decreases. The HVAC controller 116 may thus repeatedly or periodically evaluate the environmental conditions (generated by the environmental sensors 24) to the user's profile 40 to determine the fan speed 94 and the airflow rate 92.

Exemplary embodiments may consult an electronic database 200 of fan speeds. Once the HVAC controller 116 determines any environmental differential (such as the temperature differential 76 and/or the humidity differential 96), the HVAC controller 116 may query the electronic database 200 of fan speeds for the corresponding fan speed 94. FIG. 21 illustrates the electronic database 200 of fan speeds as a table 202 having electronic database associations between different environmental differentials (such as the temperature differential 76 and the humidity differential 96) to different fan speeds 94 and to different airflow rates 92. The electronic database 90 of fan speeds is illustrated as being locally stored in the HVAC controller 116, but the electronic database 90 of fan speeds may be remote stored and accessed for any network location. Once the environmental differential is determined, the HVAC controller 116 may query the electronic database 90 of fan speeds and retrieve the fan speed 94 and/or the airflow rate 92 having an electronic database association with the environmental differential. The HVAC controller 116 may then adjust the fan 88 to the fan speed 94. So, as the temperature differential 76 and the humidity differential 96 approaches the user's preferred settings 44, exemplary embodiments may lower the fan speed 94 to reduce electrical consumption and to increase fan life.

Figure 22:
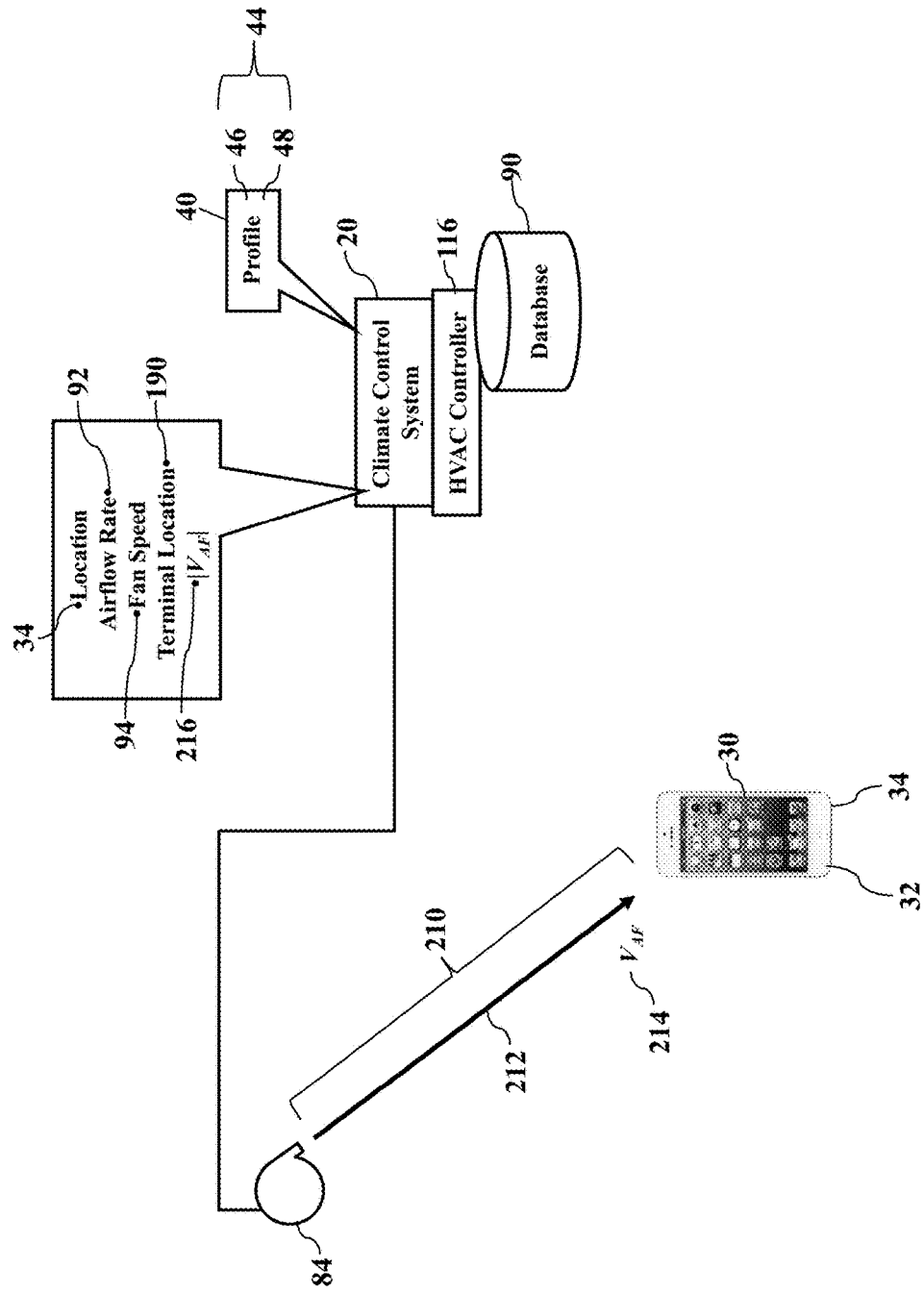
Figure 23:
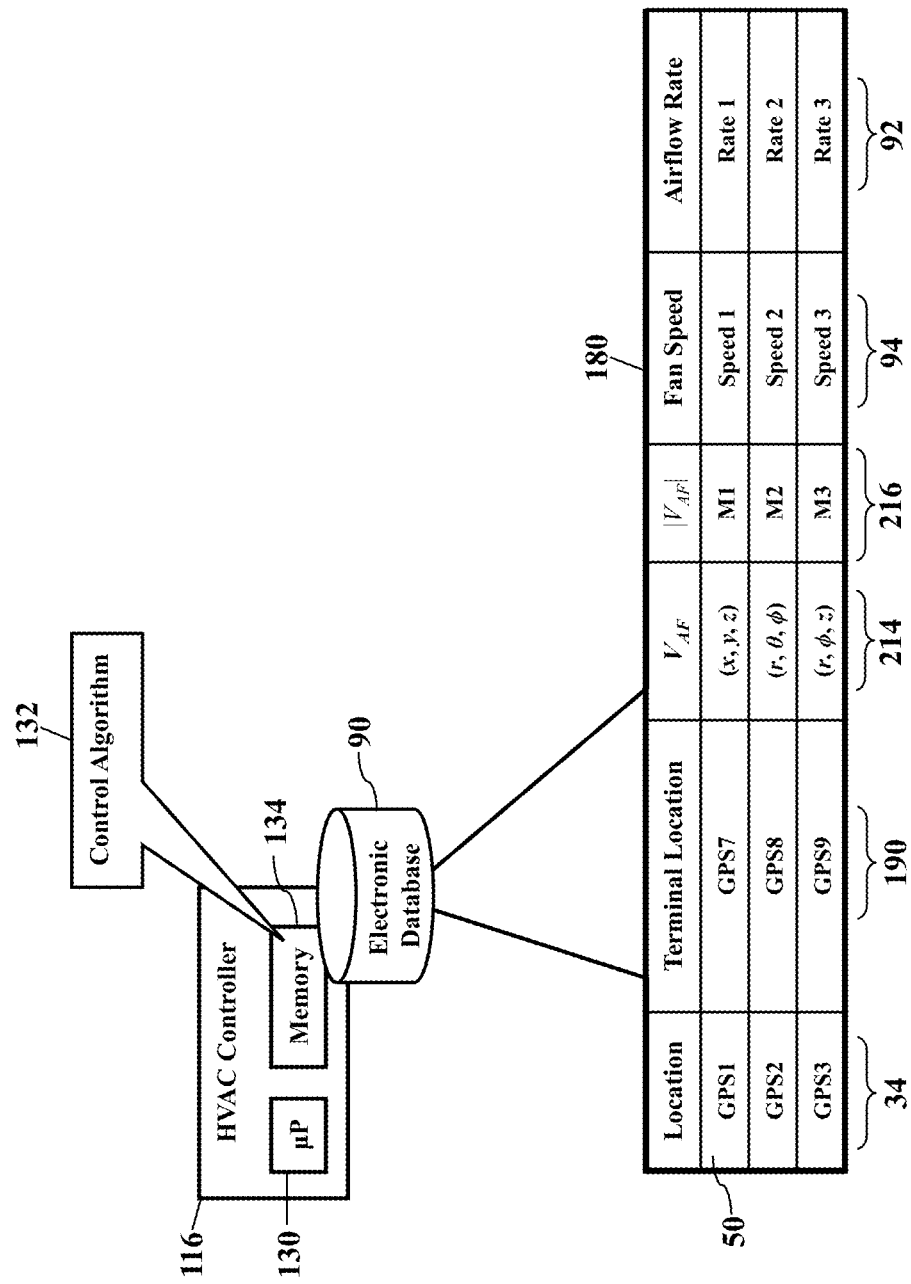
Figure 24:
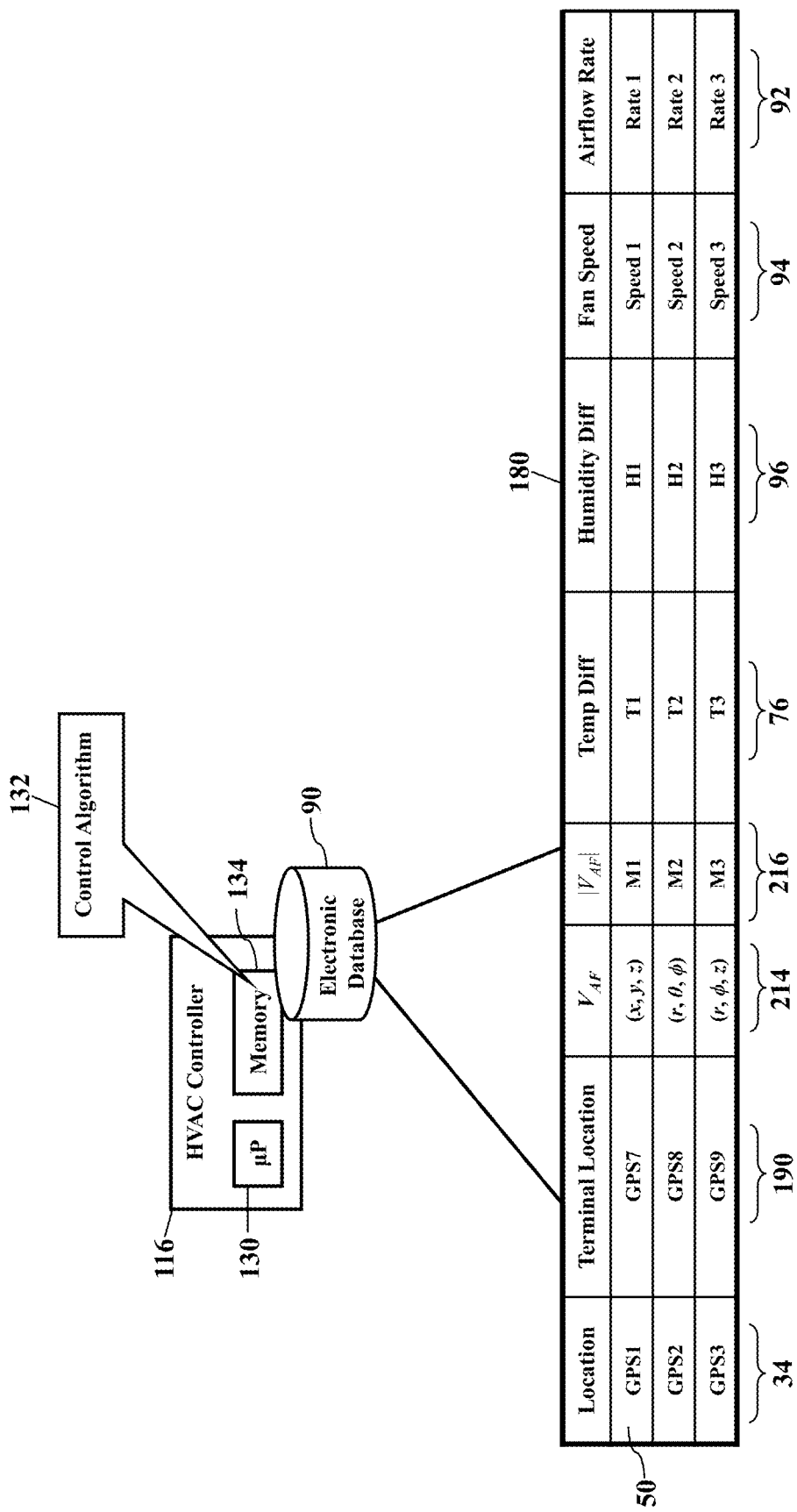

FIGS. 22-24 further illustrate the airflow rate 92, according to exemplary embodiments. Here the airflow rate 92 may be additionally or alternatively based on a distance 210 to the user's location 34 (as determined by her mobile device 30). As FIG. 22 illustrates, once the location 34 associated with the smartphone 32 is known, and once the terminal location 190 associated with the air terminal 84 is known (perhaps using the electronic database 90, as explained with reference to FIGS. 17-19), exemplary embodiments may thus determine a vector direction 212 of the airflow output from the air terminal 84. The HVAC controller 116 may thus determine an airflow vector $\vec{V}_{AF}$ (illustrated as reference numeral 214) from the terminal location 190 (associated with the air terminal 84) to the location 34 associated with the smartphone 32. For example, GPS coordinate subtraction may be used to determine vector geometries.

The airflow rate 92 may be determined. Once the airflow vector $\vec{V}_{AF}$ 214 is determined, the HVAC controller 116 may compute a corresponding magnitude $|\vec{V}_{AF}|$ 216. The magnitude $|\vec{V}_{AF}|$ 216 represents the distance 210 from the terminal location 190 (associated with the air terminal 84) to the user's location 34 (as determined from her mobile device 30). The airflow rate 92 may thus be at least partially based on the magnitude $|\vec{V}_{AF}|$ 216 or the 210 distance from the air terminal 84 to the user's smartphone 32. The HVAC controller 116, for example, may query the electronic database 90 and retrieve the airflow rate 92 and/or the fan speed 94 associated with the airflow vector $\vec{V}_{AF}$ 214.

FIGS. 23-24 illustrate the electronic database 90. Here the electronic database 90 may have electronic database associations between different airflow vectors $\vec{V}_{AF}$ 214, their corresponding magnitudes $|\vec{V}_{AF}|$ 216, different fan speeds 94, and the resultant air flow rates 92. Indeed, as FIG. 24 illustrates, the electronic database 90 may even include electronic database associations with different environmental differentials (such as different temperature differentials 76 and/or different humidity differentials 96). So, in simple words, if the magnitude $|\vec{V}_{AF}|$ 216 has a large value, then perhaps a greater airflow rate 92 is required in order to effectively heat or cool the location 34 associated with the user's smartphone 32. If the magnitude $|\vec{V}_{AF}|$ 216 is small, then perhaps a low airflow rate 92 will comfortably heat or cool the user at the location 34 associated with her smartphone 32. If the temperature differential 76 is great, perhaps a large airflow rate 92 is needed, regardless of the location 34 associated with the user's smartphone 32. Comfortable control, though, may be a functional combination of environmental differentials and magnitudes $|\vec{V}_{AF}|$ 216 to control the fan speed 94. Exemplary embodiments may thus query the electronic database 90 and retrieve the fan speed 94 having an electronic database association with the magnitude $|\vec{V}_{AF}|$ 216, the temperature differential 76, and/or the humidity differential 96. The HVAC controller 116 may then dynamically command or control the fan 88.

Figure 25:
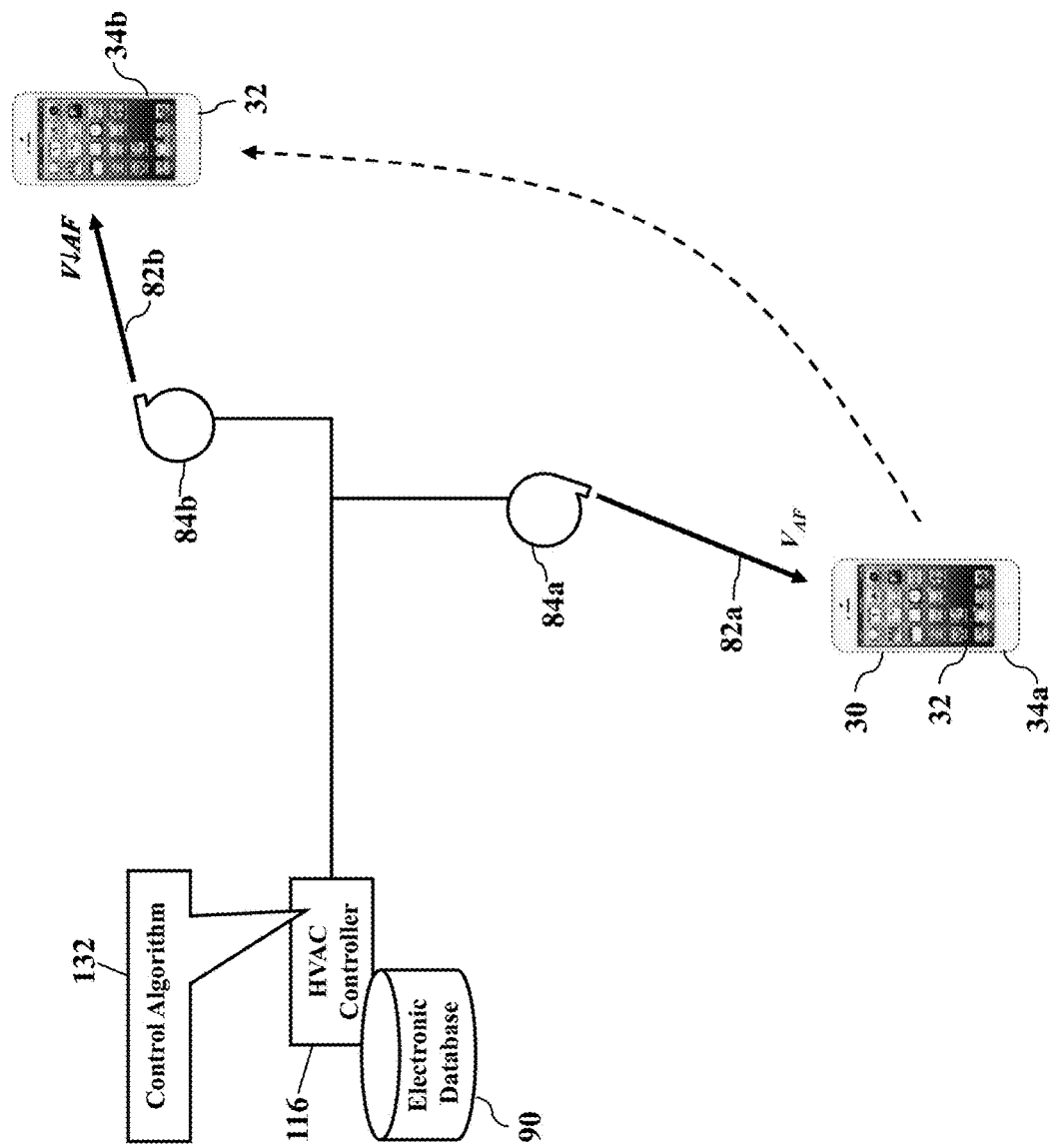
FIG. 25 illustrates terminal handoffs, according to exemplary embodiments.

FIG. 25 illustrates terminal handoffs, according to exemplary embodiments. As an occupant moves, the location 34 associated with her mobile device 30 (such as her smartphone 32) changes. At some point the smartphone 32 may become too distant from the air terminal 84 for effective heating or cooling. Exemplary embodiments, then, may switch air terminal assignments based on the most recent or freshest location 34 associated with the smartphone 32. FIG. 25, for example, illustrates the smartphone 32 moving from a first location 34a to a second location 34b. The HVAC controller 116 queries the electronic database 90 (as earlier explained) and retrieves a first air terminal 84a (mapping to the first location 34a). At some point, though, the smartphone 32 moves to the second location 34b, which maps to a different, second air terminal 84b. The HVAC controller 116 may thus switch output of the conditioned air 82a from the first air terminal 84a to the second air terminal 84b. So, as the smartphone 32 moves throughout a room or building, exemplary embodiments may thus continually track the movement and output the conditioned air 82b to the current location 34b.

Figure 26:
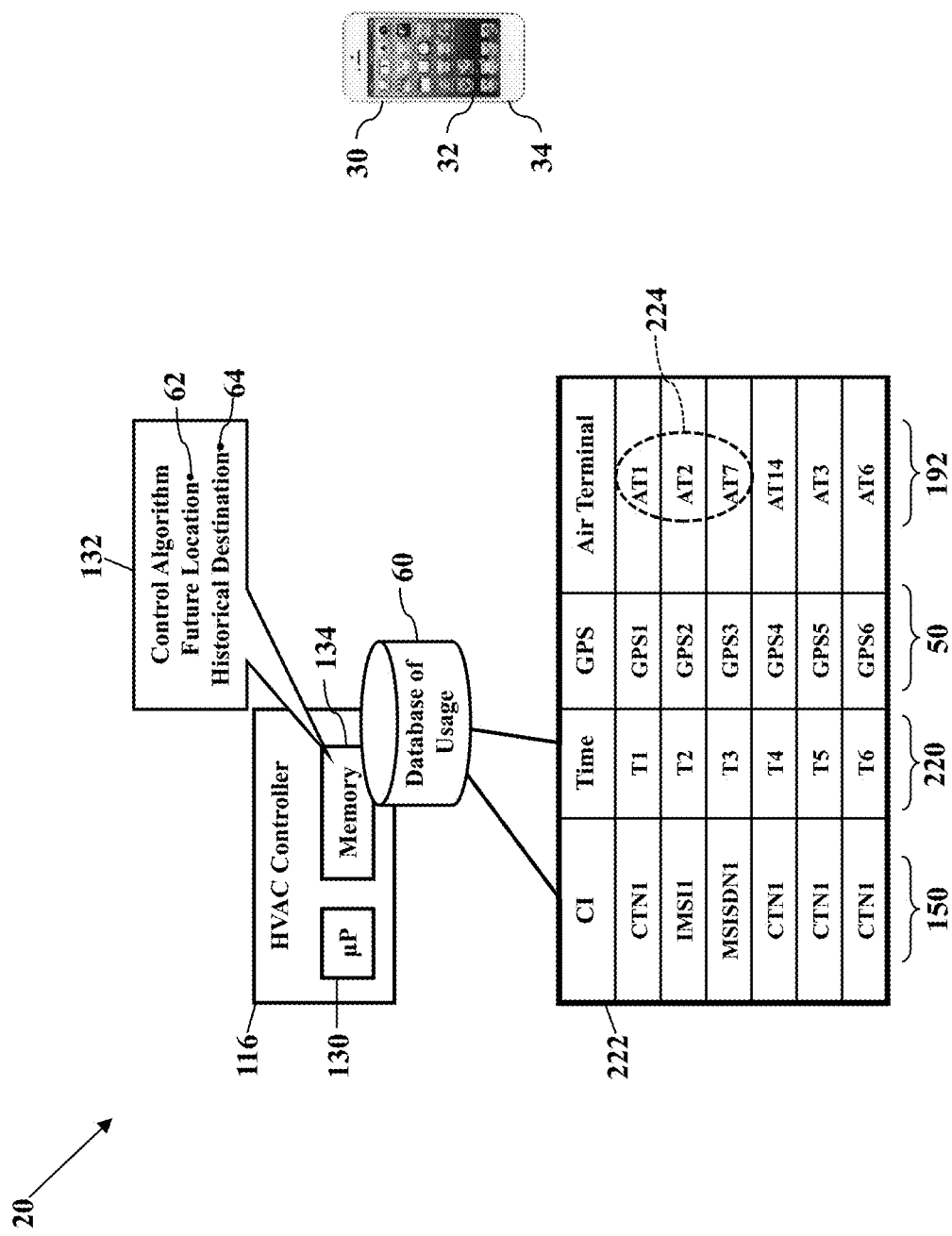
FIG. 26 illustrates locational anticipation, according to exemplary embodiments.

FIG. 26 illustrates locational anticipation, according to exemplary embodiments. As this disclosure above explained, exemplary embodiments may predict where heating or cooling is needed, based on the location 34 associated with the user's mobile device 30 (again illustrated as the smartphone 32). That is, the electronic database 60 of usage may reveal the historical movements and usage of the smartphone 32. These historical entries may be used predict or infer the smartphone's movements (such as the future location 62), based on historically observed entries (such as the historical destination 64). The HVAC controller 116 may thus begin conditioning the future location 62 in anticipation of the user's arrival.

The database 60 of usage may thus log a wealth of information. FIG. 26, for example, again illustrates GPS tracking. As the smartphone 32 operates, the smartphone 32 may report its GPS information 50. Over time 220, then, the database 60 of usage may log many entries detailing the GPS movements associated with the smartphone 32. FIG. 26 thus illustrates the database 60 of usage as a table 222 that maps or relates different cellular identifiers 150 to their corresponding GPS information 50. Exemplary embodiments may thus compare recent GPS information 50 to the historical entries tracked in the database 60 of usage and make predictions or inferences. For example, when a recent series of GPS information 50 matches a historical series, exemplary embodiments may conclude that the smartphone 32 is on track and proceeding as historically observed. Exemplary embodiments may thus select the future location 62 as an upcoming GPS location in the historical series. The climate control system 20 may determine the air terminal 84 that serves the future location 62 thus begin conditioning the future location 62, based on historically observed entries.

FIG. 26 also illustrates terminal tracking. Here exemplary embodiments may also track the location 34 associated with the user's smartphone 32 based on different air terminals (such as the air terminal identifier 192). As the smartphone 32 moves, exemplary embodiments may monitor the current location 34 and log the corresponding air terminal identifier 192 (as this disclosure above explains). Exemplary embodiments may thus add entries representing the time 220 and the air terminal identifier 192 assigned to the air terminal 84 serving the location 34 (as explained with reference to FIGS. 17-19). Again, then, over time the database 60 of usage will accumulate entries representing a historical repository of the different air terminal identifiers 192 serving the historical movements of the user's smartphone 32. If any one or more recent entries match historical entries, exemplary embodiments may thus conclude that the smartphone 32 is on track and proceeding as historically observed. Exemplary embodiments may thus select the future location 62 as an upcoming air terminal identifier 192 in any matching historical series 224. The climate control system 20 may thus begin conditioning the future location 62, based on historically observed entries.

The database 60 of usage may track multiple occupants. The above illustrations mainly illustrate the monitoring of a single user occupant. Exemplary embodiments, though, may include a network centric architecture. The database 60 of usage may thus be a central repository for many different mobile devices. That is, the database 60 of usage may be stored or maintained by any network element (such as the central server 110 illustrated in FIG. 9). Whenever any mobile device is detected, a corresponding entry may be added to the database 60 of usage. The database 60 of usage may thus log or track the locations 34 associated with many different cellular identifiers 150.

Figure 27:
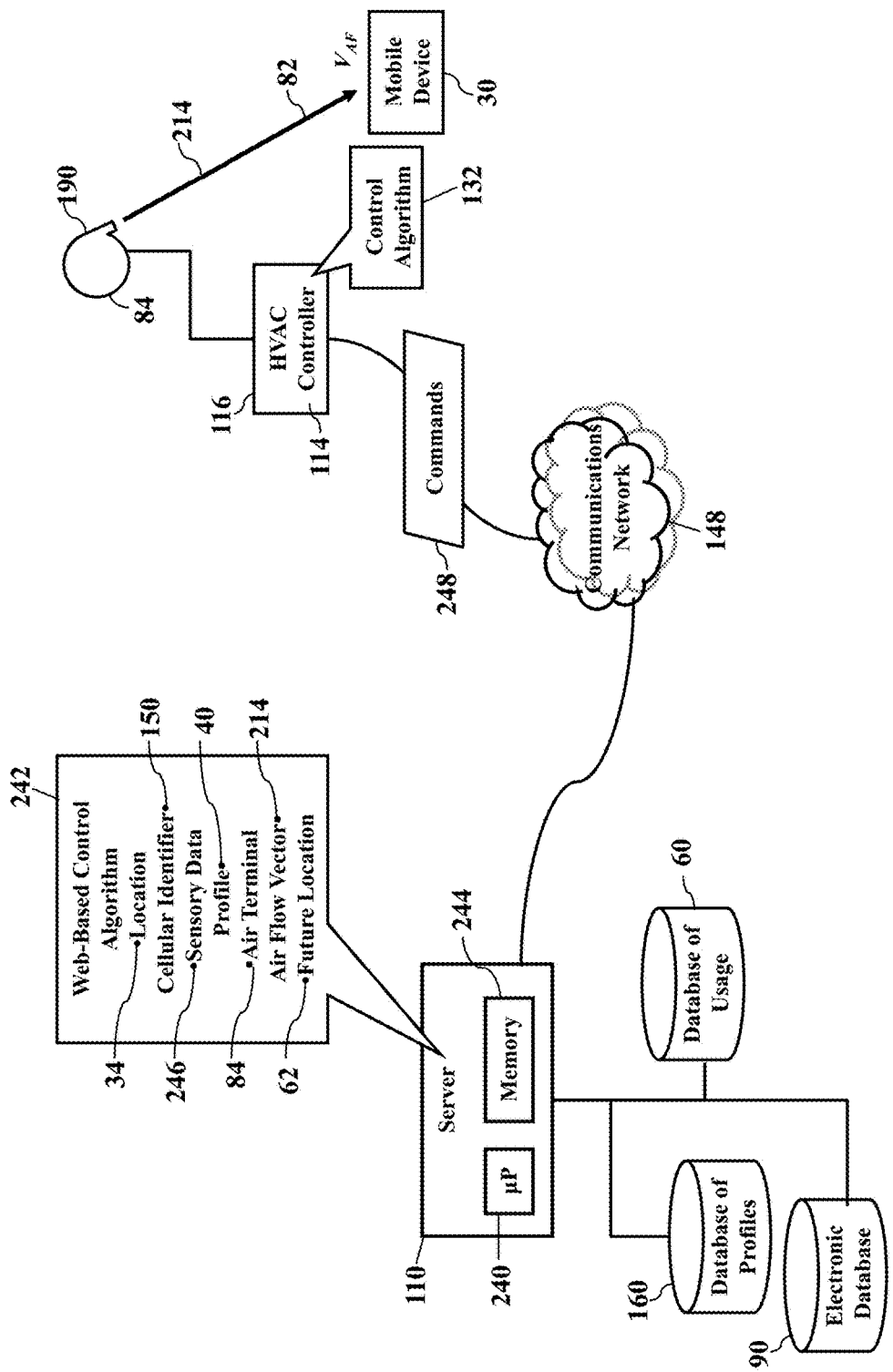
FIG. 27 thus illustrates network analysis, according to exemplary embodiments.

FIG. 27 thus illustrates network analysis, according to exemplary embodiments. Here the central server 110 may provide the web-based climate control service for client climate control systems 20. That is, once the central server 110 determines the location 34 associated with any mobile device 30, the central server 110 may condition an area environment at that location 34. The central server 110 has a processor 240 (e.g., "μP"), application specific integrated circuit (ASIC), or other component that executes a web-based control algorithm 242 stored in a memory 244. The web-based control algorithm 242 instructs the processor 240 to perform operations, such as retrieving any sensory data 246 associated with the environmental sensor(s) (illustrated as reference numeral 24 in FIG. 1). The web-based control algorithm 242, for example, may instruct the processor 240 to retrieve the location 34 associated with the cellular identifier 150 associated with the mobile device 30. The server 110 may query the database 160 of profiles and retrieve the corresponding profile 40 (as explained with reference to FIGS. 11-12). The server 110 may query the electronic database 90 and retrieve information associated with the air terminal 84 serving the location 34. The server 110 may determine the airflow vector $\vec{V}_{AF}$ (illustrated as reference numeral 214) from the terminal location 190 to the location 34 associated with the mobile device 30 (all as above explained). The central server 110 may also query the database 60 of usage and anticipate the future location 62 (again as above explained). The central server 110 may then send commands or instructions 248 to the network address 114 associated with the HVAC controller 116. The HVAC controller 116 may then execute the commands 248 to output the conditioned air 82 according to the airflow vector $\vec{V}_{AF}$ 214.

Exemplary embodiments thus include a web-based climate control service. The central server 110 may serve many different climate control systems 20 in a client-server environment. Many different residential and business systems may thus interface with the central server 110 to receive the commands 248 for any mobile device 30 that enters an area. Residential and business climate control systems are thus relieved of the perhaps burdensome processing and calculations that are required to follow the movements of the mobile devices 30. Moreover, the central server 110 provides a simple retrofit option for existing systems, which can be years or even decades old. A new climate control system may cost thousands of dollars, which is cost prohibitive, especially when still reliable. Exemplary embodiments, though, merely require retrofit of the motorized air terminal 84 and network interfacing, which is a relatively small cost.

Figure 28:
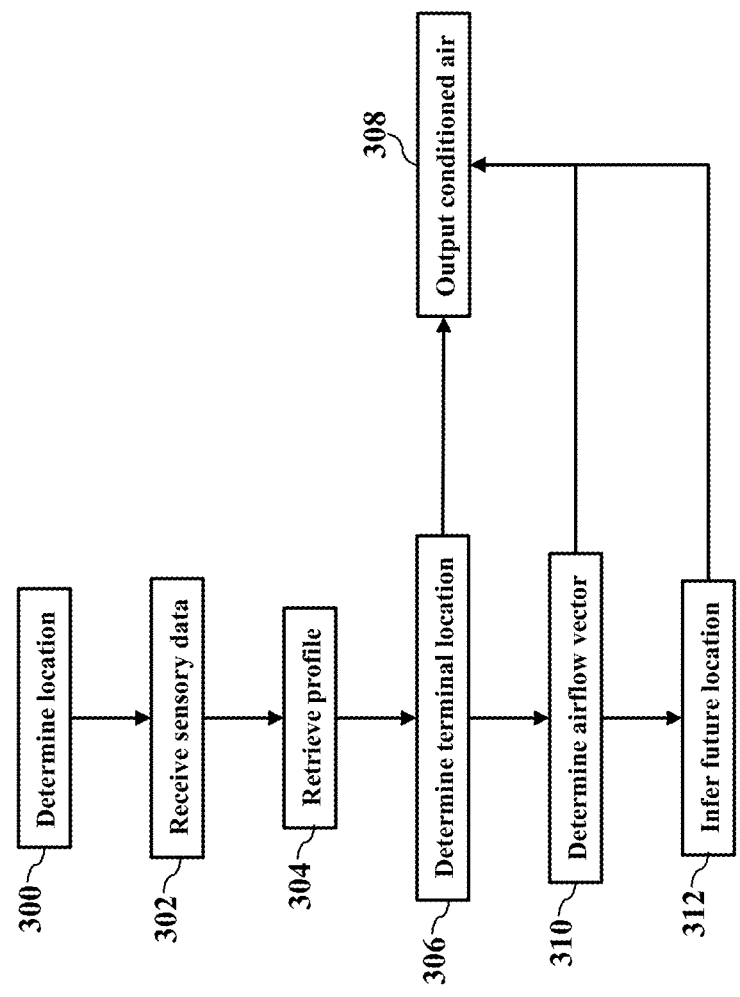
FIG. 28 is a flowchart illustrating a method or algorithm for locational environmental control, according to exemplary embodiments.

FIG. 28 is a flowchart illustrating a method or algorithm for environmental conditioning, according to exemplary embodiments. The location 34 associated with a cellular identifier 150 is determined (Block 300). The sensory data from the environmental sensors 24 is received (Block 302). The profile 40 is retrieved (Block 304). The terminal location 190 is determined (Block 306) and the conditioned air 82 is output (Block 308). If desired the airflow vector $\vec{V}_{AF}$ 214 may be determined (Block 310) and/or the future location 62 may be inferred (Block 312).

Figure 29:
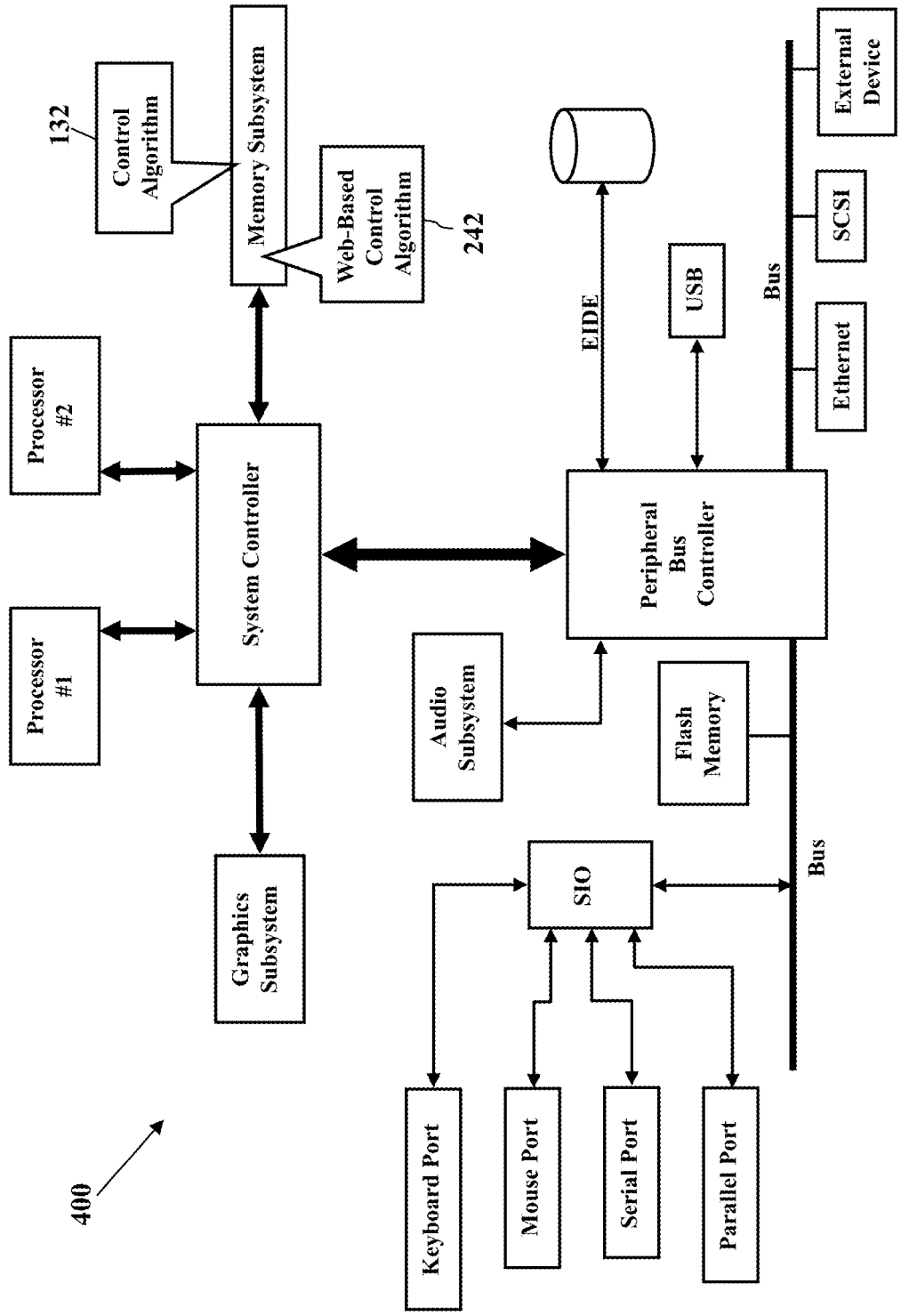
FIGS. 29-30 depict still more operating environments for additional aspects of the exemplary embodiments.

FIG. 29 is a schematic illustrating still more exemplary embodiments. FIG. 29 is a more detailed diagram illustrating a processor-controlled device 400. As earlier paragraphs explained, the control algorithm 132 and/or the web-based control algorithm 242 may partially or entirely operate in any mobile or stationary processor-controlled device. FIG. 29, then, illustrates the control algorithm 132 and/or the web-based control algorithm 242 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 30:
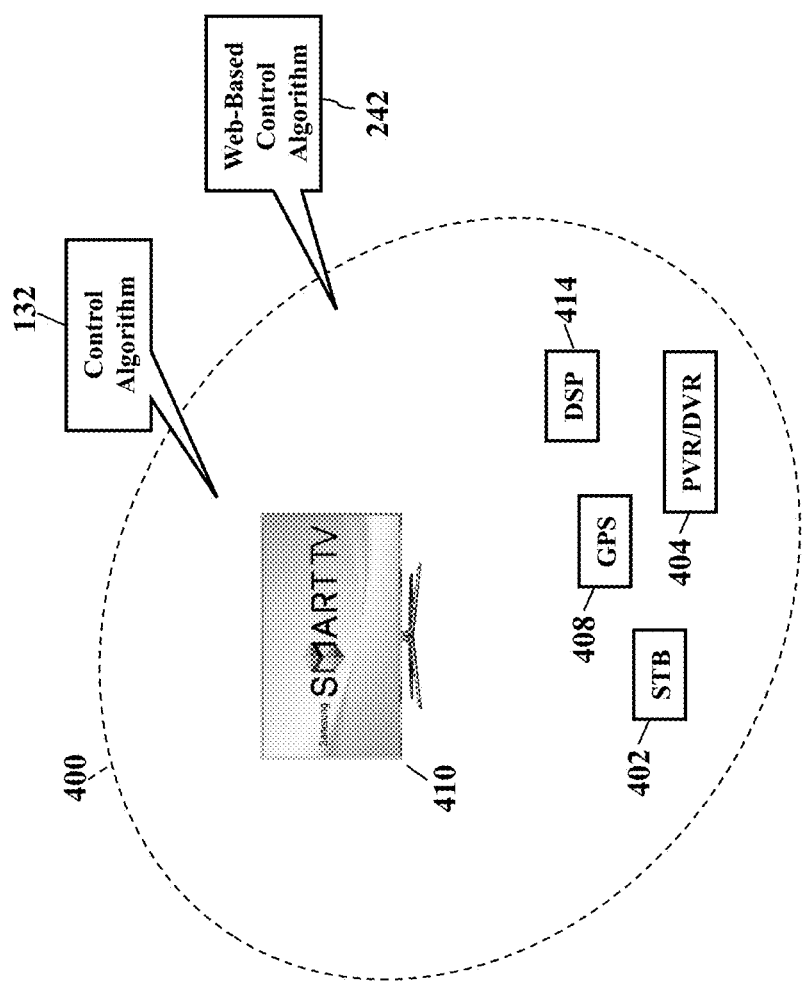

FIG. 30 depicts other possible operating environments for additional aspects of the exemplary embodiments. FIG. 30 illustrates the control algorithm 132 and/or the web-based control algorithm 242 operating within various other processor-controlled devices 400. FIG. 30, for example, illustrates that the control algorithm 132 and/or the web-based control algorithm 242 may entirely or partially operate within a set-top box ("STB") (402), a personal/digital video recorder (PVR/DVR) 404, a Global Positioning System (GPS) device 408, an interactive television 410, or any computer system, communications device, or processor-controlled device utilizing any of the processors above described and/or a digital signal processor (DP/DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be applied to any signaling standard. Mobile devices operate using one or more standards and frequencies. For example, many cellular mobile devices may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for locational environmental control, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a controller associated with a climate control system, an access notification sent from a wireless router, the access notification specifying a cellular identifier and notifying the controller to a network presence associated with a mobile device accessing a wireless network;
in response to the access notification, querying, by the controller associated with the climate control system, a home location register operating in a cellular network to identify a location reported by the mobile device;
determining, by the controller associated with the climate control system, a temperature differential associated with the location identified by the home location register;
querying, by the controller associated with the climate control system, an electronic database to identify a ceiling fan that serves the location identified by the home location register, the electronic database electronically associating ceiling fans associated with the climate control system and locations including the location identified by the home location register;
querying, by the controller associated with the climate control system, the electronic database to identify an airflow rate, the electronic database electronically associating temperature differentials to airflow rates including the temperature differential associated with the location identified by the home location register;
determining, by the controller associated with the climate control system, a fan speed that corresponds to the airflow rate identified by the electronic database;
first activating, by the controller associated with the climate control system, the ceiling fan identified by the electronic database with an instruction to rotate at the fan speed to reduce the temperature differential;
in response to the temperature differential exceeding a maximum value, determining, by the controller associated with the climate control system, that a conditioned air is required to reduce the temperature differential;
querying, by the controller associated with the climate control system, the electronic database to identify an air terminal that serves the location identified by the home location register, the electronic database electronically associating air terminals to the locations including the location identified by the home location register;
determining, by the controller associated with the climate control system, an airflow vector that originates at the air terminal and that terminates at the location identified by the home location register; and
sending, by the controller associated with the climate control system, an electronic message to the air terminal, the electronic message instructing the air terminal to output the conditioned air from the climate control system according to the airflow vector to reduce the temperature differential.

2. The method of claim 1, further comprising identifying a network address assigned to the ceiling fan.

3. The method of claim 2, further comprising sending an instruction to the ceiling fan, the instruction instructing the ceiling fan to activate.

4. The method of claim 1, further comprising:
in response to the temperature differential indicating the location identified by the home location register is too warm, then selecting a rotational direction associated with ceiling fan for a cooling effect; and
in response to the temperature differential indicating the location identified by the home location register is too cool, then selecting an opposite rotational direction associated with ceiling fan for a warming effect.

5. The method of claim 1, further comprising receiving a global positioning system information identified by the home location register.

6. The method of claim 4, further comprising instructing the ceiling fan to activate in at least one of the rotational direction and the opposite rotational direction to relieve the temperature differential.

7. A memory device storing instructions that when executed cause a hardware processor to perform operations, the operations comprising:
   receiving an access notification sent from a wireless router to a controller associated with a climate control system, the access notification specifying a cellular identifier and notifying the controller to a network presence associated with a mobile device accessing a wireless network;
   in response to the access notification, querying a home location register operating in a cellular network to identify a location reported by the mobile device;
   determining a temperature differential associated with the location identified by the home location register;
   querying an electronic database to identify a ceiling fan that serves the location identified by the home location register, the electronic database electronically associating ceiling fans associated with the climate control system and locations including the location identified by the home location register;
   first activating the ceiling fan identified by the electronic database with an instruction to rotate to reduce the temperature differential;
   in response to the temperature differential exceeding a maximum value, determining that a conditioned air is required to reduce the temperature differential;
   querying the electronic database to identify an air terminal that serves the location identified by the home location register, the electronic database electronically associating air terminals to the locations including the location identified by the home location register;
   determining an airflow vector that originates at the air terminal and that terminates at the location identified by the home location register;
   determining a magnitude of the airflow vector that originates at the air terminal and that terminates at the location identified by the home location register;
   querying the electronic database to identify an airflow rate, the electronic database electronically associating magnitudes of air flow vectors to airflow rates including the magnitude of the airflow vector that originates at the air terminal and that terminates at the location identified by the home location register;
   querying the electronic database to identify a fan speed, the electronic database electronically associating fan speeds to the magnitudes of the airflow vectors including the magnitude of the airflow vector that originates at the air terminal and that terminates at the location identified by the home location register; and
   sending an electronic message to the air terminal, the electronic message instructing the air terminal to output the conditioned air from the climate control system according to the airflow vector, the airflow rate, and the fan speed to reduce the temperature differential.

8. The memory device of claim 7, wherein the operations further comprise identifying a network address assigned to the ceiling fan.

9. The memory device of claim 7, wherein the operations further comprise sending an instruction to the ceiling fan, the instruction instructing the ceiling fan to activate.

10. The memory device of claim 7, wherein the operations further comprise:
   in response to the temperature differential indicating the location identified by the home location register is too warm, then selecting a rotational direction associated with ceiling fan for a cooling effect; and
   in response to the temperature differential indicating the location identified by the home location register is too cool, then selecting an opposite rotational direction associated with ceiling fan for a warming effect.

11. The memory device of claim 7, wherein the operations further comprise receiving a global positioning system information identified by the home location register.

12. The memory device of claim 10, wherein the operations further comprise instructing the ceiling fan to activate in at least one of the rotational direction and the opposite rotational direction to relieve the temperature differential.

13. A system, comprising:
   a controller associated with a climate control system; and
   a memory device, the memory device storing instructions, the instructions when executed causing the controller to perform operations, the operations comprising:
   receiving an access notification sent from a wireless router, the access notification specifying a cellular identifier and notifying the controller to a network presence associated with a mobile device accessing a wireless network;
   in response to the access notification, querying a home location register operating in a cellular network to identify a location reported by the mobile device;
   determining a temperature differential associated with the location identified by the home location register;
   querying an electronic database to identify a ceiling fan that serves the location identified by the home location register, the electronic database electronically associating ceiling fans associated with the climate control system and locations including the location identified by the home location register;
   querying the electronic database to identify an airflow rate, the electronic database electronically associating temperature differentials to airflow rates including the temperature differential associated with the location identified by the home location register;
   determining a fan speed that corresponds to the airflow rate identified by the electronic database;
   first activating the ceiling fan identified by the electronic database with an instruction to rotate at the fan speed to reduce the temperature differential;
   in response to the temperature differential exceeding a maximum value, determining that a conditioned air is required to reduce the temperature differential;
   querying the electronic database to identify an air terminal that serves the location identified by the home location register, the electronic database electronically associating air terminals to the locations including the location identified by the home location register;
   determining an airflow vector that originates at the air terminal and that terminates at the location identified by the home location register; and
   sending an electronic message to the air terminal, the electronic message instructing the air terminal to output the conditioned air from the climate control system according to the airflow vector to reduce the temperature differential.

14. The system of claim 13, wherein the operations further comprise identifying a network address assigned to the ceiling fan.

15. The system of claim 13, wherein the operations further comprise sending an instruction to the ceiling fan, the instruction instructing the ceiling fan to activate.

16. The system of claim 13, wherein the operations further comprise selecting a rotational direction associated with ceiling fan.

17. The system of claim 16, wherein the operations further comprise instructing the ceiling fan to activate in the rotational direction to relieve the temperature differential.

18. The system of claim 13, wherein the operations further comprise receiving a global positioning system information identified by the home location register.

\* \* \* \* \*